United States Patent
Chiba et al.

(10) Patent No.: US 10,678,470 B2
(45) Date of Patent: Jun. 9, 2020

(54) COMPUTER SYSTEM, CONTROL METHOD FOR PHYSICAL STORAGE DEVICE, AND RECORDING MEDIUM

(71) Applicant: Hitachi, Ltd., Chiyoda-ku, Tokyo (JP)

(72) Inventors: Takeru Chiba, Tokyo (JP); Shintaro Ito, Tokyo (JP); Mitsuo Hayasaka, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 79 days.

(21) Appl. No.: 16/081,389

(22) PCT Filed: Apr. 5, 2016

(86) PCT No.: PCT/JP2016/061057
§ 371 (c)(1),
(2) Date: Aug. 30, 2018

(87) PCT Pub. No.: WO2017/175285
PCT Pub. Date: Oct. 12, 2017

(65) Prior Publication Data
US 2020/0057563 A1    Feb. 20, 2020

(51) Int. Cl.
*G06F 3/06* (2006.01)
*G06F 11/10* (2006.01)

(52) U.S. Cl.
CPC ............ *G06F 3/065* (2013.01); *G06F 3/0619* (2013.01); *G06F 3/0665* (2013.01); *G06F 3/0689* (2013.01); *G06F 11/1076* (2013.01)

(58) Field of Classification Search
CPC ...... G06F 3/065; G06F 3/0619; G06F 3/0665; G06F 3/0689; G06F 11/1076
See application file for complete search history.

(56) References Cited

U.S. PATENT DOCUMENTS

2015/0324145 A1    11/2015 Akutsu et al.

FOREIGN PATENT DOCUMENTS

WO    2014/115320 A1    7/2014

*Primary Examiner* — Yaima Rigol
*Assistant Examiner* — Kendrick Lam
(74) *Attorney, Agent, or Firm* — Procopio, Cory, Hargreaves & Savitch LLP

(57) ABSTRACT

Securing redundancy for physical storage devices that are extended in units smaller than physical storage devices configuring one RAID group. When d+r pieces of physical storage devices are connected by connecting r pieces of physical storage devices, a computer: adds v×r pieces of logical chunks; adds n×v pieces of physical storage areas in each additional storage device; changes mapping information to associate n pieces of physical storage areas with v×(d+r) pieces of logical chunks under a mapping condition; in response to a write request of user data, creates redundant data; determines a first logical chunk corresponding to the write request; and respectively writes n pieces of element data including the user data and the redundant data into n pieces of physical storage areas corresponding to the first logical chunk, based on the mapping information.

12 Claims, 28 Drawing Sheets

FIG. 12

| Pool# | Tier# | DG# | VPG# | ALLOCATABLE Vchunk NUMBER |
|---|---|---|---|---|
| 0 | 0 | 0 | 0 | 16 |
|  |  |  | ... | ... |
|  |  |  | 3 | 16 |
|  |  | 1 | 8 | 16 |
|  |  |  | ... | ... |
|  |  |  | 23 | 4 |
|  |  | 2 | 32 | 16 |
|  |  |  | ... | ... |
|  |  |  | 63 | 8 |
| 1 | 0 | 3 | 96 | 16 |
|  |  |  | ... | ... |
|  |  |  | 127 | 12 |

POOL MANAGEMENT TABLE 1001

FIG. 13

| PPG# | PCDEV# | STATE |
|---|---|---|
| 0 | 0 | NORMAL |
|  | 1 | INACCESSIBLE |
|  | ... | ... |
|  | 7 | NORMAL |
| 1 | 0 | NORMAL |
|  | 1 | NORMAL |
|  | ... | ... |
|  | 7 | NOT MOUNTED |

DRIVE STATE MANAGEMENT TABLE 1002

FIG. 14

PAGE MAPPING TABLE 1003

| Pool# (1300) | VVOL# (1301) | VVOL Page# (1302) | VPG# (1303) | VPG Page# (1304) |
|---|---|---|---|---|
| 0 | 1 | 0 | 1 | 0 |
|   |   | 1 | 1 | 1 |
|   |   | 2 | 1 | 33 |
|   |   | 3 | NOT ALLOCATED | NOT ALLOCATED |
|   |   | ... | ... | ... |
|   | 2 | 0 | 2 | 0 |
|   |   | 1 | 2 | 3 |
|   |   | ... | ... | ... |
| 1 | 3 | 0 | 3 | 2 |
|   | 4 | 0 | 4 | 9 |

FIG. 15

SWAP POINTER TABLE 1004

| Pool# (1305) | DG# (1306) | PG EXTENSION SWAP POINTER (1307) | SINGLE EXTENSION SWAP POINTER (1308) |
|---|---|---|---|
| 0 | 0 | 0x00000030 | NaN |
|   | 1 | NaN | NaN |
|   | 2 | NaN | NaN |
|   | 3 | NaN | NaN |
| 1 | 0 | NaN | 0x00001000 |
|   | 1 | NaN | NaN |

FIG. 16

| Index# | | | Value | | | SWAP FLAG |
|---|---|---|---|---|---|---|
| PPG# | PCDEV# | Pcycle# | PPG# | PCDEV# | Pcycle# | |
| 0 | 0 | 0 | 0 | 0 | 0 | OFF |
| 0 | 0 | 1 | 1 | 0 | 0 | ON |
| ... | ... | ... | ... | ... | ... | ... |
| 1 | 0 | 0 | 0 | 0 | 1 | ON |
| 1 | 0 | 1 | 1 | 0 | 1 | OFF |
| ... | ... | ... | ... | ... | ... | ... |
| 1 | 1 | 0 | NaN | NaN | NaN | OFF |
| 1 | 1 | 1 | NaN | NaN | NaN | OFF |
| ... | ... | ... | ... | ... | ... | ... |
| MAPPING CORRECTION TABLE 1005 | | | | | | |

FIG. 17

| Index# | | | Value | | |
|---|---|---|---|---|---|
| PPG# | PCDEV# | Pcycle# | PPG# | PCDEV# | Pcycle# |
| 0 | 0 | 0 | 0 | 0 | 0 |
| 0 | 0 | 1 | 1 | 0 | 0 |
| ... | ... | ... | ... | ... | ... |
| 1 | 0 | 0 | 0 | 0 | 1 |
| 1 | 0 | 1 | 1 | 0 | 1 |
| ... | ... | ... | ... | ... | ... |
| NaN | NaN | NaN | 1 | 1 | 0 |
| NaN | NaN | NaN | 1 | 1 | 1 |
| ... | ... | ... | ... | ... | ... |
| MAPPING INVERSE CORRECTION TABLE 1006 | | | | | |

(P2-0) BEFORE SWAP (P2a) Goal MAPPING PATTERN (P2-1) PERFORM SWAP OF PARCELS WHERE BOTH IN SWAP TARGET PAIR ARE TO BE COINCIDENT WITH Goal (P2-2) PERFORM SWAP OF PARCELS WHERE ONE IN SWAP TARGET PAIR IS TO BE COINCIDENT WITH Goal
(FIRST TIME)    (SECOND TIME)

(P3) AFTER COMPLETION OF SWAP (P1) BEFORE DRIVE EXTENSION (INITIAL STATE)

(P2) AFTER DRIVE EXTENSION (BEFORE SWAP)

(P2a) Goal MAPPING PATTERN (P3) AFTER DRIVE EXTENSION (SWAP COMPLETED)

COMPUTER SYSTEM, CONTROL METHOD FOR PHYSICAL STORAGE DEVICE, AND RECORDING MEDIUM

TECHNICAL FIELD

The present invention relates to a computer system.

BACKGROUND ART

There is known a storage system that forms a redundant array of inexpensive (or independent) disks (RAID) group with a plurality of storage apparatuses, and provides a logical volume created based on the RAID group to a higher-level device (e.g., a host computer).

As a technique related to the RAID, PTL 1 discloses a so-called distributed RAID method, which is a technique that distributes and manages a stripe column including normal data and redundant data for restoring the normal data, in a plurality of storage apparatuses that provide a storage area to a capacity pool.

CITATION LIST

Patent Literature

PTL 1: WO 2014/115320 A

SUMMARY OF INVENTION

Technical Problem

Not only in the distributed RAID method, in general, when capacity is added to a storage system configured from a RAID group having redundant data, that is, when a drive is extended, the drive is extended in units of the number of drives configuring the RAID group in order to ensure redundancy equal to an existing area also for the extended drive. However, since one set of the RAID group may be configured from 20 or more drives, a high cost for adding capacity becomes a problem.

Further, in a case of adopting the distributed RAID method as in PTL 1, for example, a minimum number of drives of a system needs to be two parity groups or more. Therefore, a high cost at a time of initial introduction also becomes a problem.

Influence by these problems is particularly remarkable in an all flash array (AFA) where a storage media in the system is configured only of solid state drive (SSD) with high bit cost, or in a storage system of a mid-range or lower with a small number of mounted drives.

Solution to Problem

In order to solve the above problem, a computer system according to one aspect of the present invention includes d pieces of physical storage devices and a computer connected to the d pieces of physical storage devices, while d is an integer of 2 or more. The computer is configured to, while n is an integer of 2 or more and v is an integer of 1 or more: create n×v×d pieces of physical storage areas by creating n×v pieces of physical storage areas in each physical storage device; create v×d pieces of logical chunks each having a size of n pieces of physical storage areas; store mapping information that associates n pieces of physical storage areas with each logical chunk, and has been created under a mapping condition that n pieces of physical storage devices respectively include the n pieces of physical storage areas associated with each logical chunk; when d+r pieces of physical storage devices are connected to the computer by connecting r pieces of physical storage devices to the computer, add v×r pieces of logical chunks while r is an integer of 1 or more, add n×v pieces of physical storage areas in each additional storage device, and change the mapping information to mapping information that associates n pieces of physical storage areas with each of v×(d+r) pieces of logical chunks under the mapping condition; and in response to a write request of user data, create redundant data that is based on the user data, determine a first logical chunk corresponding to the write request, and respectively write n pieces of element data including the user data and the redundant data into n pieces of physical storage areas corresponding to the first logical chunk, based on the mapping information.

Advantageous Effects of Invention

Even if a physical storage device is extended in units smaller than physical storage devices configuring one RAID group, redundancy can be secured. This can minimize a cost at a time of adding capacity, even in an all flash array (AFA) configured only of an SSD with high bit cost, or in a storage system of a mid-range or lower with a small number of mounted drives. Further, by selecting any number of drives to be extended while considering performance and cost, it is possible to increase the degree of freedom of extension.

In addition, it is possible to reduce the minimum number of drives to 1 parity group+1 in a case of applying the distributed RAID method, thus minimizing a cost of initial introduction.

BRIEF DESCRIPTION OF DRAWINGS

FIG. 12 shows a pool management table.

FIG. 13 shows a drive state management table.

FIG. 14 shows a page mapping table.

FIG. 15 shows a SWAP pointer table.

FIG. 16 shows a mapping correction table.

FIG. 17 shows a mapping inverse correction table.

DESCRIPTION OF EMBODIMENTS

Figure 1:
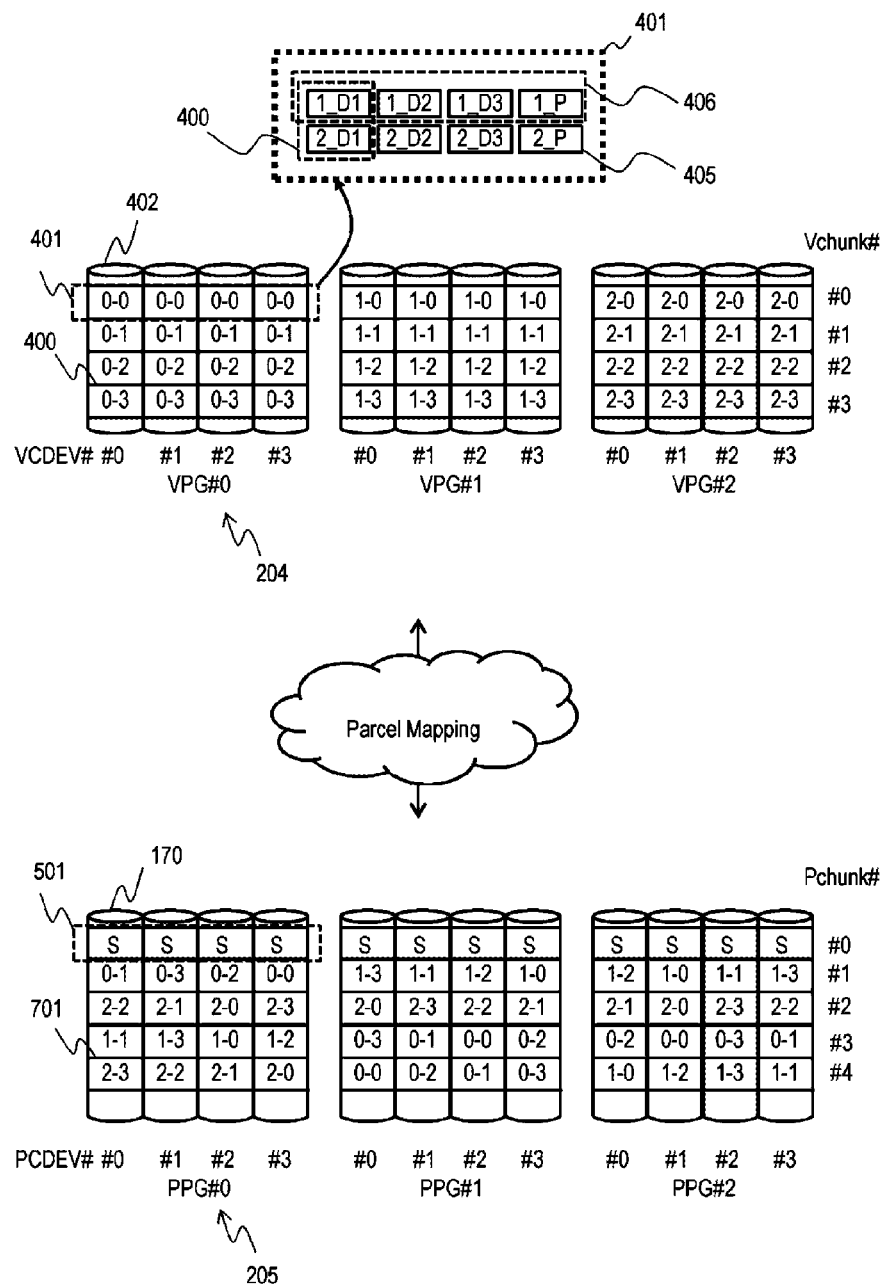
FIG. 1 shows an outline of a mapping between a virtual storage area and a physical storage area in a computer system of the present embodiment.

Hereinafter, some embodiments will be described with reference to the drawings.

It should be noted that, in the following description, various kinds of information may be described with an expression of "aaa table", but various kinds of information may be represented by a data structure other than a table. The "aaa table" can also be referred to as "aaa information" in order to indicate that it is independent of a data structure.

In addition, in the following description, while processing may be described with a "program" as a subject, a subject of processing may be a program since the program executes prescribed processing while appropriately using storage resources (e.g., a memory) and/or a communication interface device (e.g., a port), by being executed by a processor (e.g., a central processing unit (CPU)). The processing described with the program as the subject may be processing performed by a processor or a computer (e.g., a management computer, a host computer, or a controller) having the processor. In addition, a controller (storage controller) may be the processor itself, or may include a hardware circuit that executes a part or all of the processing executed by the controller. The program may be installed on each controller from a program source. The program source may be, for example, a program distribution server or a computer readable storage medium.

Further, in the following description, an ID is used as identification information of an element, but alternatively or additionally, another type of identification information may be used.

Further, in the following description, a reference numeral or a common number in the reference numeral may be used when describing a same kind of elements without discrimination, while the reference numeral of an element may be used or an ID allocated to an element may be used instead of the reference numeral when describing a same kind of elements with discrimination.

Further, in the following description, an input/output (I/O) request is a write request or a read request and may be referred to as an access request.

The RAID group may be referred to as a parity group (PG).

FIG. 1 shows an outline of a mapping between a virtual storage area and a physical storage area in a computer system of the present embodiment.

An upper portion of this figure shows the virtual storage area, and a lower portion of this figure shows the physical storage area.

The computer system of the present embodiment provides a virtual volume to a host, and allocates the virtual storage area provided by a virtual storage drive 402 to the virtual volume. The virtual storage area is, for example, a page.

Further, a virtual parity group (VPG) 204 including a plurality of virtual storage drives 402 is configured. In an example of this figure, four virtual storage drives 402 configure one virtual parity group 204. In the example of this figure, three virtual parity groups 204 are shown, and a VPG # (number) is given to each of the three virtual parity groups 204. In addition, a virtual column device (VCDEV) # indicating a position in the virtual parity group is given to each drive belonging to each virtual parity group 204. In the example of this figure, four virtual storage drives 402 are shown in each virtual parity group 204, and a different VCDEV # is given to each of the four virtual storage drives 402.

The virtual parity group 204 is a redundant array of inexpensive disks (RAID) group, and stores a redundant data set extending across a plurality of virtual storage drives 402. The redundant data set is a data set for rebuilding data in the RAID and includes data from a host and redundant data.

The virtual storage area is divided into virtual stripes 405 of a predetermined size. The virtual stripe 405 of a specific logical address in each of the plurality of virtual storage drives 402 in the virtual parity group 204 configures a virtual stripe column 406. In the example of this figure, four virtual stripes 405 configure one virtual stripe column 406. The virtual stripe column 406 stores the redundant data set. The redundant data set includes data D from a host and a parity P based on the data D. Each virtual stripe 405 in one virtual stripe column 406 stores the data D or the parity P in a corresponding redundant data set.

It should be noted that the data D may be referred to as user data. The parity P may be referred to as redundant data. Data stored in each virtual stripe in the redundant data set may be referred to as element data.

In one virtual storage drive 402, one virtual stripe 405 or a predetermined number of virtual stripes 405 with consecutive logical addresses configure one virtual parcel 400. In the example of this figure, two virtual stripes 405 having consecutive logical addresses configure one virtual parcel 400.

Further, a predetermined number of virtual stripe columns 406 having consecutive logical addresses configure a virtual chunk (Vchunk) 401. The virtual chunk 401 is one virtual parcel column. The virtual parcel column is configured from a virtual parcel 400 of a specific logical address in each of a plurality of virtual storage drives 402 in one virtual parity group 204. In other words, one virtual chunk 401 is configured from one or more virtual stripe columns 406 having consecutive logical addresses. In the example of this figure, one virtual chunk 401 is configured from two virtual stripe columns 406 having consecutive logical addresses. In the example of this figure, twelve virtual chunks 401 are shown, and a Vchunk # in the VPG 204 is given to each of the twelve virtual chunks 401. When the virtual parcel 400 is configured from one virtual stripe 405, the virtual chunk 401 is configured from one virtual stripe column 406.

In the example of this figure, a pair of numbers written in each virtual parcel 400 is a Vchunk identifier represented by the VPG # and the Vchunk #. For example, the virtual parcel 400 whose Vchunk identifier is "0-1" indicates that it belongs to a VPG #=0 and a Vchunk #=1.

The virtual storage area is mapped to the physical storage area provided by a physical storage drive 170. A physical parity group (PPG) 205 including a plurality of the physical storage drives 170 is configured. In the example of this figure, four physical storage drives 170 configure one physical parity group 205. In the example of this figure, three physical parity groups 205 are shown, and a PPG # is given to each of the three physical parity groups 205. A mapping between the virtual storage area and the physical storage area may be referred to as a parcel mapping. In addition, a physical column device (PCDEV) # indicating a position in the physical parity group is given to each drive belonging to each physical parity group 205. In the example of this figure, four physical storage drives 170 are shown in each physical parity group 205, and a different PCDEV # is given to each of the four physical storage drives 170.

Each virtual parcel 400 in the virtual chunk 401 is mapped to a physical parcel 701 in the physical storage area. A number in each physical parcel 701 indicates a Vchunk identifier (VPG # and Vchunk #) to which the corresponding virtual parcel 400 belongs, and "S" indicates a spare area.

Similarly to the virtual chunk 401, a physical chunk (Pchunk) 501 is configured in the physical storage area. The physical chunk 501 is configured from a physical parcel 701 of a specific physical address in each of a plurality of physical storage drives 170 in one physical parity group 205. In the example of this figure, 15 pieces of physical chunks 501 are shown, and a Pchunk # is given to each of the 15 pieces of physical chunks 501. Each physical chunk 501 is identified by a Pchunk # and a PPG #.

In the example of this figure, a plurality of virtual parcels 400 in the virtual chunk 401 are respectively mapped to a plurality of different physical storage drives 170 for failure restoration. In other words, the plurality of virtual stripes 405 in the virtual stripe column 406 are also respectively mapped to different physical storage drives 170. As a result, the redundant data set includes pieces of element data (the data D or the parity P) of the number of physical storage drives in the physical parity group, and the pieces of element data are respectively written into the physical storage drives 170 of the number of physical storage drives in the physical parity group.

In addition, the plurality of virtual parcels 400 included in the virtual chunk 401 are distributed and mapped to one or more physical parity groups 205. That is, the virtual stripe 405 configuring each virtual chunk 401 can be distributed and mapped to a plurality of physical parity groups 205. Thus, the computer system reduces a load of I/O processing concentrated on a specific physical storage drive 170.

The parcel mapping satisfies a mapping condition. The mapping condition is that each virtual chunk 401 is mapped to a plurality of physical storage drives 170. In other words, the mapping condition is that a plurality of physical parcels 701 in one physical storage drive 170 are not mapped to a same virtual chunk 401.

In the physical storage area, a physical chunk 501 of a predetermined Pchunk # is allocated to a spare area, and in the example of this figure, a physical chunk 501 with the Pchunk # of 0 is allocated to the spare area.

Hereinafter, a computer system according to an embodiment will be described. In the following description, as an example for realizing the present embodiment, it is sometimes described using a configuration disclosed in PTL 1, but the present embodiment is not limited to the configuration shown in PTL 1.

Figure 2:
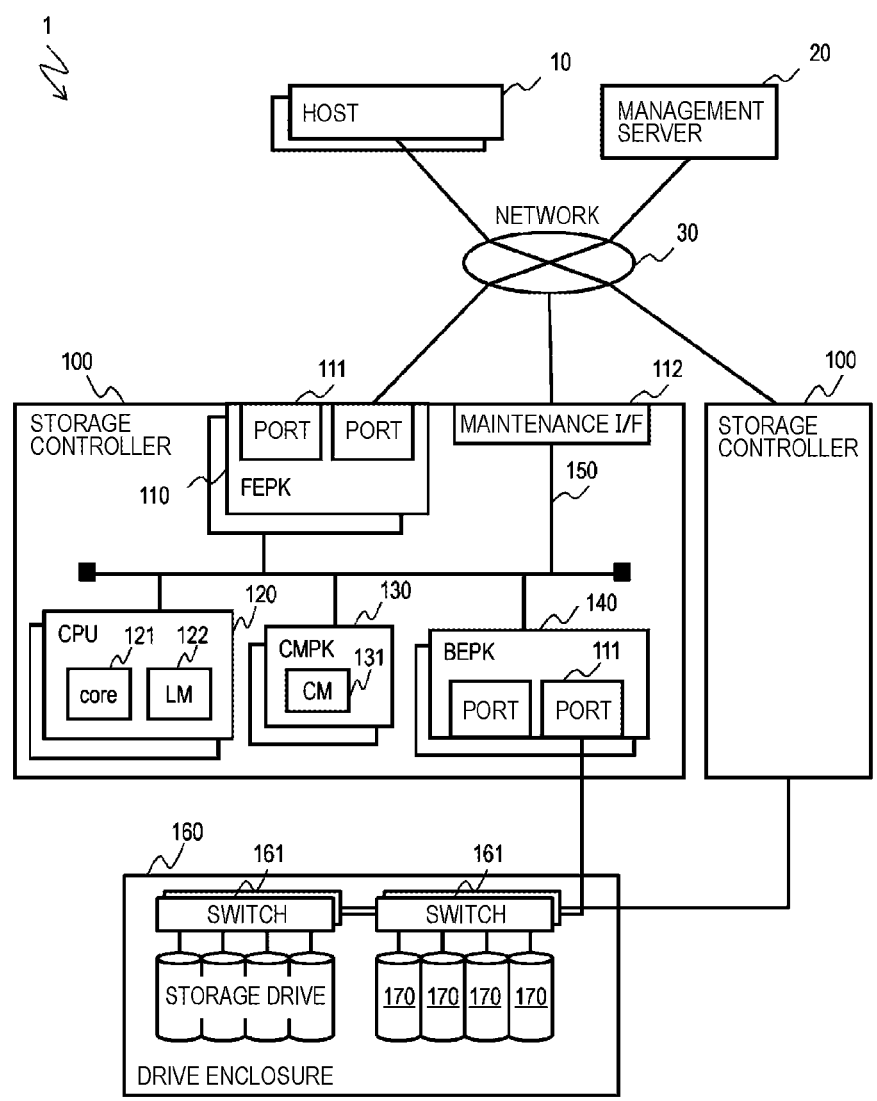
FIG. 2 shows a hardware configuration of the computer system according to the present embodiment.

FIG. 2 shows a hardware configuration of the computer system according to the present embodiment.

A computer system 1 includes one or more host computers (hereinafter referred to as hosts) 10, a management server 20, a storage controller 100, and a drive enclosure 160. The host computer 10, the management server 20, and the storage controller 100 are connected via a network 30. The drive enclosure 160 is connected to the storage controller 100. The network 30 may be a local area network (LAN) or a wide area network (WAN). The host 10 and the storage controller 100 may be one computer. Further, each of the host 10 and the storage controller 100 may be a virtual machine.

The host 10 is, for example, a computer that executes an application, and host 10 reads out data used by the application from the storage controller 100 and writes data created by the application into the storage controller 100.

The management server 20 is a computer to be used by an administrator. The management server 20 may include an input device to input information and an output device to display information. The management server 20 accepts setting of a type of data restoration processing for restoring data through an operation of the administrator on the input device, and sets the storage controller 100 to execute the accepted data restoration processing.

A storage system includes, for example, the storage controller 100 and the drive enclosure 160. The drive enclosure 160 includes a plurality of physical storage drives 170 (also simply referred to as drives). The physical storage drive 170 includes one or more storage media. The storage medium is, for example, a magnetic disk, a flash memory, or other non-volatile semiconductor memory (PRAM, ReRAM, or the like).

The storage controller 100 has one or more front end packages (FEPK) 110, a maintenance interface (maintenance I/F) 112, one or more CPUs 120, one or more cache memory packages (CMPK) 130, one or more back end packages (BEPK) 140, and an internal network 150.

The FEPK 110, the maintenance I/F 112, the CPU 120, the CMPK 130, and the BEPK 140 are connected via the internal network 150. The BEPK 140 is connected to the drive enclosure 160 via paths of a plurality of systems.

The FEPK 110 is an example of an interface with the host 10, and has one or more ports 111. The port 111 connects the storage controller 100 to various devices via the network 30 and the like. The maintenance I/F 112 is an interface to connect the storage controller 100 with the management server 20.

The CPU 120 is a control unit, and has one or more Cores 121 and a local memory (LM) 122. The Core 121 executes a program stored in the LM 122 to execute various processes. The Core 121 transmits various commands (e.g., a READ command, a WRITE command, or the like in SCSI) to the physical storage drive 170 in the drive enclosure 160 via the BEPK 140. The LM 122 stores various programs and various kinds of information.

The CMPK 130 has one or more cache memories (CM) 131. The CM 131 temporarily stores data (write data) to be written from the host 10 into the physical storage drive 170, and data (read data) read from the physical storage drive 170.

The BEPK 140 is an example of an interface with the drive enclosure 160 and has one or more ports 111.

The drive enclosure 160 has a plurality of physical storage drives 170.

The storage controller 100 manages a capacity pool (hereinafter simply referred to as a pool) configured from storage areas of a plurality of physical storage drives 170. The storage controller 100 configures the RAID group by using the storage areas in the pool. That is, the storage controller 100 configures a plurality of virtual parity groups (VPG) by using a plurality of physical storage drives 170. The VPG is a virtual RAID group.

A storage area of the VPG is configured from a plurality of sub storage area columns. Each sub storage area column is configured from a plurality of sub storage areas. The plurality of sub storage areas extend across a plurality of physical storage drives 170 configuring the VPG, and correspond to the plurality of physical storage drives 170, respectively. Here, one sub storage area is referred to as "stripe", and a sub storage area column is referred to as "stripe column". A storage area of the RAID group is configured from a plurality of the stripe columns.

The RAID has several levels (hereinafter referred to as "RAID level"). For example, in RAID 5, write-target data specified by a host computer compatible with RAID 5 is divided into data of a predetermined size (hereinafter referred to as "data unit" for convenience). Each data unit is divided into a plurality of data elements. The plurality of data elements are respectively written into a plurality of stripes in a same stripe column.

In RAID 5, in order to rebuild data elements that can no longer be read out from the physical storage drive 170 due to a failure in the physical storage drive 170, redundant information referred to as "parity" (hereinafter, "redundant code") is generated for each data unit. The redundant code is also written into a stripe in the same stripe column as the plurality of data elements.

For example, when there are four physical storage drives 170 configuring the RAID group, three data elements configuring the data unit are written into three stripes corresponding to three physical storage drives 170 among the four physical storage drives 170, and the redundant code is written in a stripe corresponding to one remaining physical storage drive 170. Hereinafter, in a case without discrimination between a data element and a redundant code, both may be referred to as stripe data elements.

In RAID 6, two kinds of redundancy codes (P parity, Q parity) are generated for each data unit, and respective redundancy codes are written into stripes in a same stripe column. This enables data restoration of two data elements when the two data elements out of a plurality of data elements configuring a data unit cannot be read out.

There are RAID levels other than those described above (e.g., RAID 1 to RAID 4). As a data redundancy technique, a triple mirror (Triplication), a triple parity technique using three parities, and the like are also available. There are also various techniques such as Reed-Solomon code that uses Galois operation, EVEN-ODD, and the like as a redundant code generation technique. In the following, while RAID 5 or 6 will be mainly described, the redundancy technique can be replaced with the above-mentioned method.

When any physical storage drive 170 in the physical storage drives 170 fails, the storage controller 100 restores a data element stored in the failed physical storage drive 170.

The Core 121 in the central processing unit (CPU) 120 acquires a stripe data element (e.g., other data element and parity) required for restoring the data element stored in the failed physical storage drive 170, from the plurality of physical storage drives 170 storing the data. The Core 121 stores the acquired stripe data element in the cache memory (CM) 131 via an interface device (e.g., the BEPK 140). Thereafter, the data element is restored based on the stripe data element of the cache memory 131, and the data element is stored in a predetermined physical storage drive 170.

For example, for a data unit of a RAID group configured from RAID 5, the Core 121 generates a P parity by taking an exclusive OR (XOR) of a plurality of data elements configuring the data unit. For a data unit of a RAID group configured from RAID 6, the Core 121 further generates a Q parity by multiplying a plurality of data elements configuring the data unit by a predetermined coefficient, and then taking an exclusive OR of the respective data.

Hereinafter, an operation of the Core 121 may be described as an operation of the storage controller 100.

Figure 3:
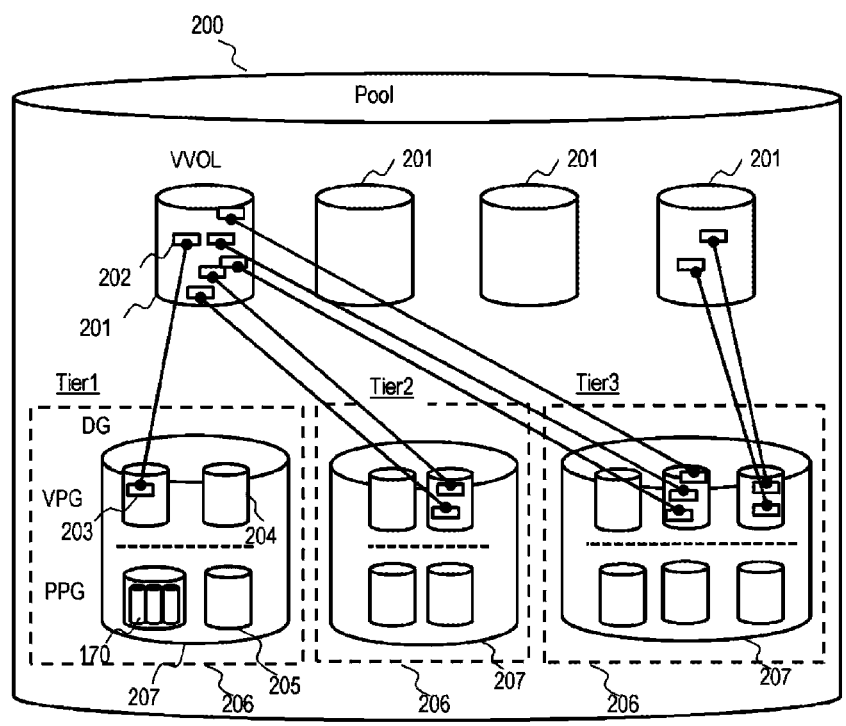
FIG. 3 shows a logical configuration of the computer system according to the present embodiment.

FIG. 3 shows a logical configuration of the computer system according to the present embodiment.

The storage controller 100 bundles a plurality of, for example, four drives 170 to configure the physical parity group (PPG) 205. The storage controller 100 configures a distribution group (DG) 207 including one or more physical parity groups 205, and one or more corresponding virtual parity groups (VPG) 204.

The storage controller 100 allocates a part of storage area of the plurality of the PPGs 205 in the DG 207 to the VPG 204 in the same DG 207. This causes a virtual stripe column, which is a virtual stripe column in the VPG 204, to be distributed to drives of the plurality of the PPGs 205 within a range of the DG 207. That is, as a result of the I/O request to the VPG 204, the drive 170 is not accessed beyond the range of the DG 207 to which the VPG 204 belongs. In the DG 207, there are the same number of the VPGs 204 and the PPGs 205, and their identification numbers existing in the DG 207 are also the same. A pool 200, which is a collection of logical storage capacities, includes one or more DGs 207.

As described above, the storage controller 100 may have, as the drive 170, a plurality of types of drives having different performance characteristics, such as a flash memory drive, a SAS drive, and a SATA drive, for example. The drive 170 is classified into a Tier 206 according to different characteristics. Since each Tier 206 has different performance characteristics, when the DG 207 is configured from drives 170 belonging to different Tiers 206, a drive with low performance becomes a bottleneck. Therefore, the DG 207 is preferably configured to include only drives 170 belonging to a single Tier 206.

In the pool 200, there are a plurality of virtual volumes (VVOL) 201. The VVOL 201 is a virtual storage device and can be referred to from the host 10. In response to an instruction from the administrator of the storage controller 100, the management server 20 causes the storage controller 100 to create the VVOL 201 of any size via the maintenance I/F 112. The size does not depend on the total capacity of the actual drive 170. The storage controller 100 dynamically allocates a storage area (VPG Page 203) in the VPG 203 to a storage area (VVOL Page 202) in the VVOL 201 indicated by the I/O request (host I/O) from the host 10.

The storage controller 100 may record an access frequency for each VVOL Page 202, and may allocate a high-performance VPG Page 203 to a high frequency VVOL Page 202. For example, in this figure, the high-performance VPG Page 203 is a VPG Page 203 belonging to a VPG 204 in the Tier 206 configured from a high-performance flash memory drive. The storage controller 100 may continuously monitor a load of the VVOL Page 202 and periodically change the allocation of the VPG Page 203.

Figure 4:
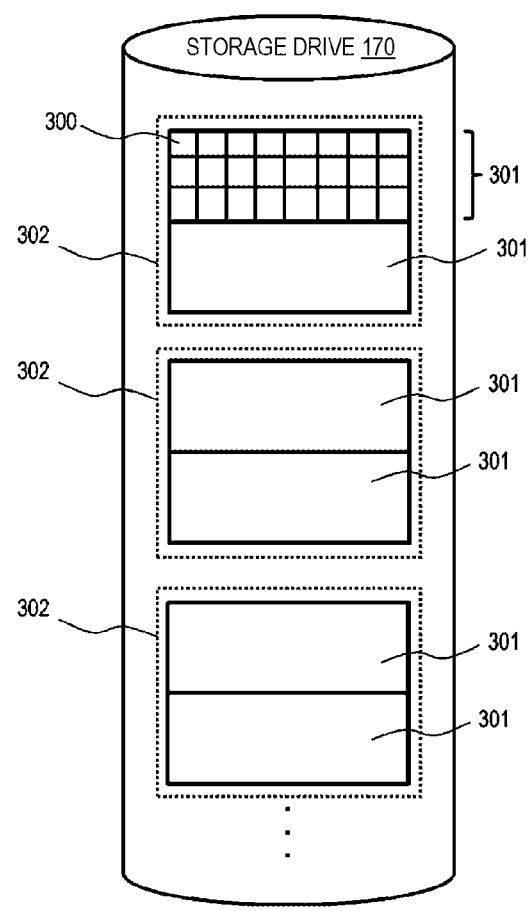
FIG. 4 shows a data configuration of a physical storage drive.

FIG. 4 shows a data configuration of the physical storage drive.

The physical storage drive 170 exchanges data between with a higher-level device such as the storage controller 100 in units of a sub block 300, which is a minimum unit (e.g., 512 bytes) of SCSI command processing. A slot 301 is a management unit for caching data on the cache memory 131, and is, for example, 256 KB. The slot 301 is configured from a collection of a plurality of consecutive sub blocks 300. A physical stripe 302 stores a plurality of (e.g., two) slots 301.

Figure 5:
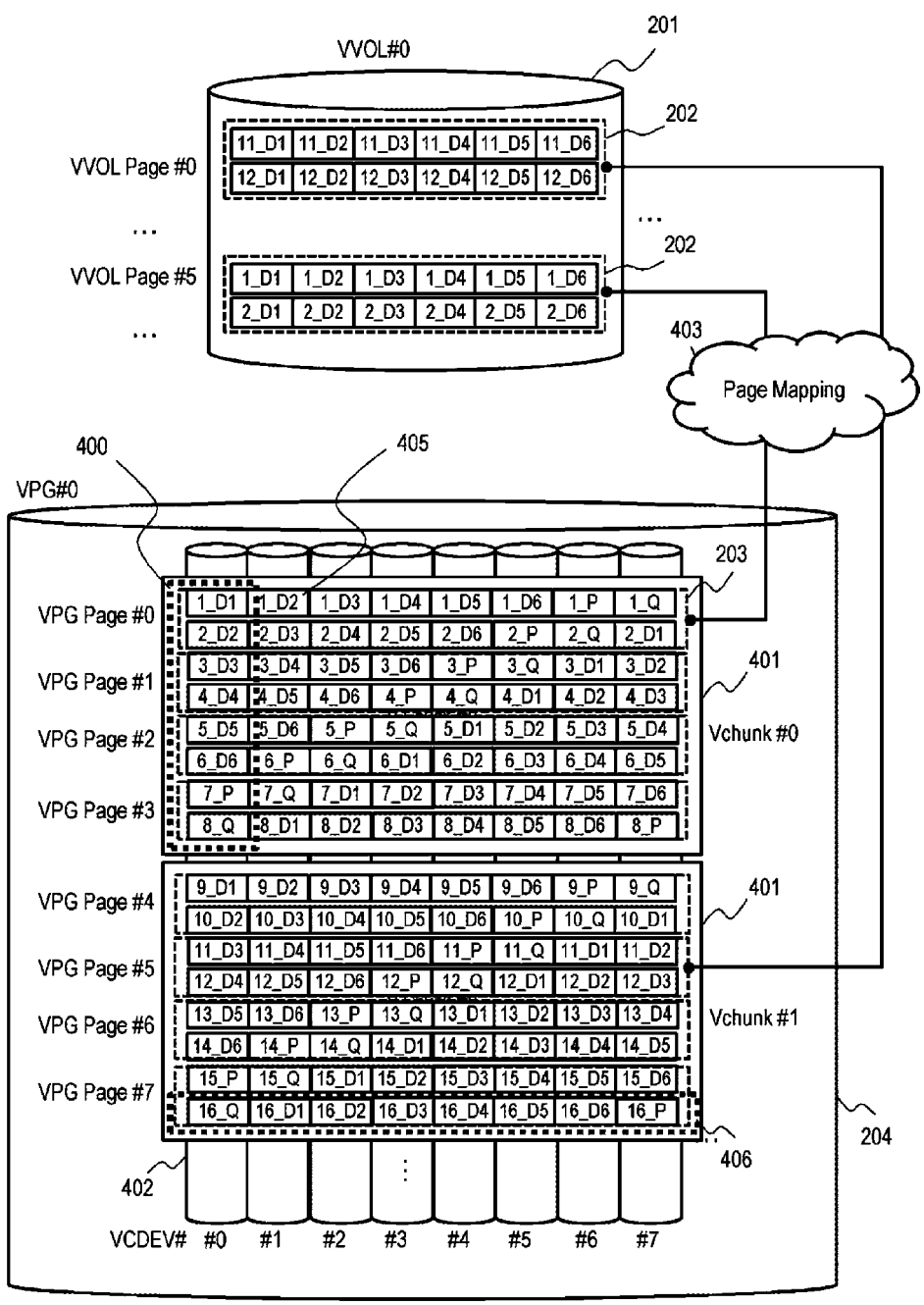
FIG. 5 shows a page mapping of a virtual volume.

FIG. 5 shows a page mapping of the virtual volume.

The VVOL 201 that can be recognized by the host 10 is configured from a plurality of VVOL pages 202. The VVOL 201 has a unique identifier (VVOL number). The storage controller 100 allocates the VPG Page 203 in the VPG 204 to the VVOL Page 202. This relationship is referred to as a page mapping 403. The page mapping 403 is dynamically managed by the storage controller 100. To a plurality of VVOL pages with consecutive VVOL page #, addresses of consecutive VVOL spaces are given.

The VPG 204 includes one or more virtual chunks (Vchunk) 401. The Vchunk 401 is configured from the plurality of virtual parcels 400. In an example of this figure, the Vchunk 401 is configured from eight virtual parcels 400.

The virtual parcel 400 is configured from consecutive areas in one virtual storage drive 402. The virtual parcel 400 is configured from one or more virtual stripes 405. In the example of this figure, the virtual parcel 400 is configured from eight virtual stripes 405. The number of virtual stripes 405 in the virtual parcel 400 is not particularly limited. By the virtual parcel 400 including a plurality of virtual stripes 405, efficiency of processing is realized.

In the example of this figure, the VPG 204 has a 6D+2P configuration of RAID 6. That is, six data elements (D) configuring a data unit and two parities (P, Q) corresponding to these data elements are stored in each of different physical storage drives 170. In this case, the Vchunk 401 is configured from, for example, the virtual parcels 400 of eight different physical storage drives 170.

In other words, the Vchunk 401 is configured from a plurality of virtual stripe columns 406, and in the example of this figure, the Vchunk 401 is configured from eight virtual stripe columns 406. By the Vchunk 401 including a plurality of virtual stripe columns 406, efficiency of processing is realized. It should be noted that the Vchunk 401 may be configured from one virtual stripe column 406.

The Vchunk 401 includes a plurality of (e.g., four) VPG Pages 203. The VPG Page 203 can store stripe data elements of a plurality of (e.g., two) consecutive virtual stripe columns 406. For example, by setting this plurality of data units to several MB, a sequential performance of the host I/O can be maintained constant even when the drive 170 is a magnetic disk or the like.

In this figure, those having a common numeral before "_", such as 1_D1, 1_D2, 1_D3, 1_D4, 1_D5, 1_D6, 1_P, and 1_Q, indicate stripe data elements of a same virtual stripe column 406. It should be noted that a size of each stripe data element is a size of the physical stripe 302.

The VPG 204 has a unique identifier (VPG number) in a higher-level storage system. Further, a drive number (VCDEV number) is given to each of the N pieces of virtual storage drives 402 in each VPG 204. This is an identifier for addressing a storage area in the VPG 204, and is an identifier for representing a correspondence with a drive in the PPG 205 to be described later. N may be referred to as the number of PG drives.

Each VVOL 201 is accessed from the host 10 by using an identifier representing the VVOL 201 and an LBA. As shown in this figure, a VVOL Page # is given to the VVOL Page 202 from a head of the VVOL 201. For the LBA specified by the host I/O, the VVOL Page # can be calculated by the following formula. Here, Floor (x) is a symbol indicating a maximum integer equal to or less than x with respect to a real number x. Each of the LBA and the VVOL Pagesize may be represented by the number of sub blocks.

VVOL Page #=Floor(LBA/VVOL Pagesize)

In addition, each of the VVOL Page 202 and the VPG Page 203 is configured from a plurality of virtual stripes. However, since the host 10 does not access parity data, the parity cannot be seen on the VVOL 201. For example, in the case of 6D+2P shown in this figure, the VPG Page 203 including 8×2 pieces of virtual stripes in a space of the VPG 204 appears as a VVOL Page 202 including 6×2 pieces of virtual stripes in a space of the VVOL 201.

The storage controller 100 can calculate, together with the page mapping 401, a VCDEV # and a Vchunk # for a VPG # corresponding to the LBA on the VVOL 201 side, and an offset address in the virtual parcel 400 by correcting the space of the VPG 204 and the space of the VVOL 201. Naturally, the storage controller 100 can also calculate a VCDEV # and a Vchunk # for a VPG # in a parity area corresponding to the host I/O, and an offset address in the virtual parcel 400.

This figure shows a case of using RAID 6 (6D+2P), but the number of D may be increased, such as 14D+2P, for example, or RAID 5 or RAID 1 may be used. Further, a virtual parcel with only a parity such as RAID 4 may be created. In a case of normal RAID 4, there is an advantage that a logic design of an upper layer can be simplified, while there is a disadvantage that a parity drive tends to be a bottleneck since access concentrates on the parity drive at a time of Write. However, in a case of the distributed RAID configuration, since data in the parity drive on the VPG 204 is distributed over the plurality of physical storage drives 170 on the PPG 205, it is possible to minimize an influence of the disadvantage. Further, encoding of the Q parity in RAID 6 may be performed by using other generally known methods such as an EVEN-ODD method other than the Galois operation.

Figure 6:
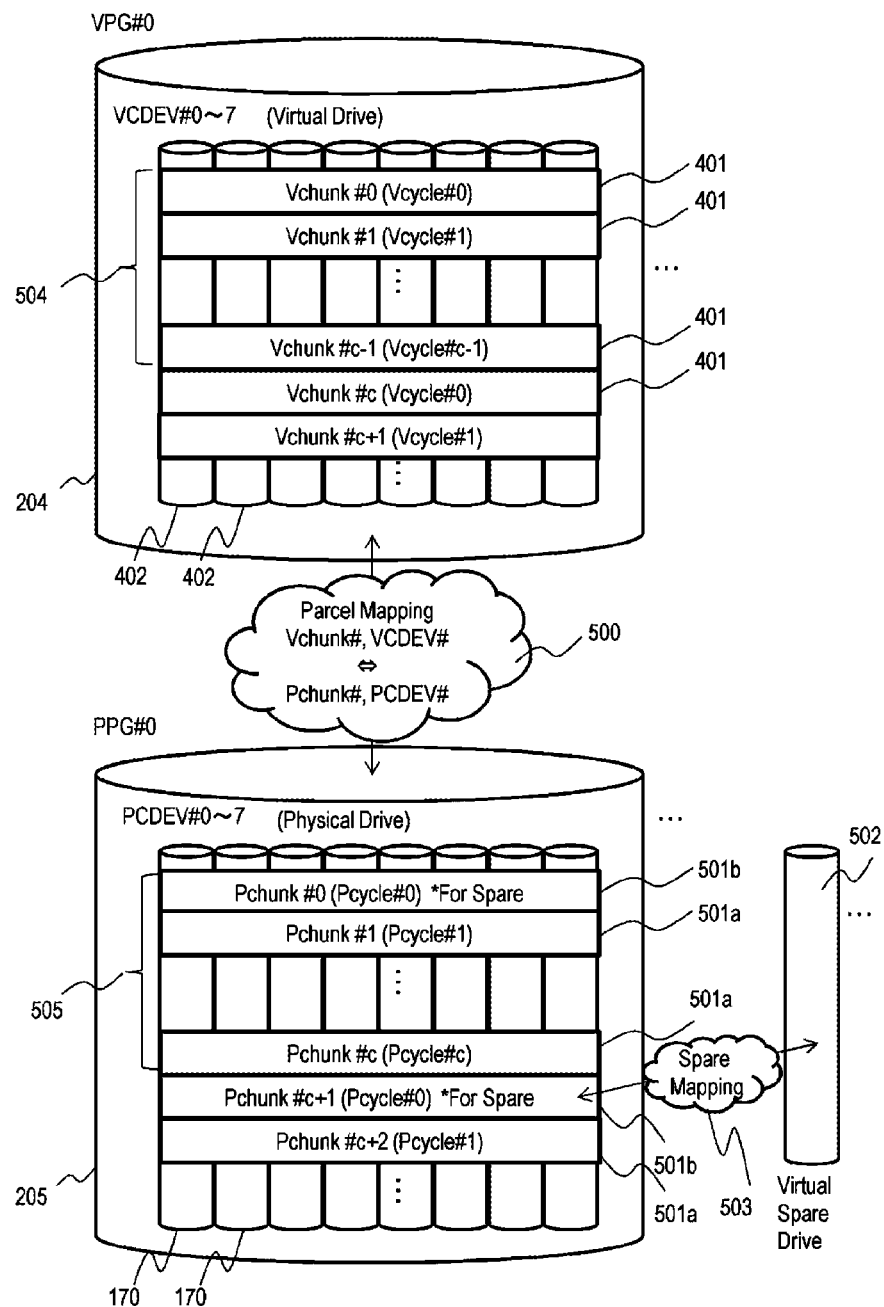
FIG. 6 shows a parcel mapping between a VPG and a PPG.

FIG. 6 shows a parcel mapping between a VPG and a PPG.

As described above, the Vchunk 401 is consecutive in a space of the storage area of the VPG 204. The consecutive c pieces of Vchunks 401 configure a Vchunk cycle 504. The PPG 205 includes one or more physical chunks (Pchunk) 501. The Pchunk 501 is configured from a plurality of physical parcels. In an example of this figure, the Pchunk 501 is configured from eight physical parcels.

One or more consecutive Pchunk 501b and c pieces of Pchunks 501a configure a Pchunk cycle 505. The symbol c is referred to as a cycle Vchunk number. The Pchunk 501b is a spare area, and a Pchunk 501a is a data area. One Vchunk cycle 504 corresponds to one Pchunk cycle 505. Further, a parcel mapping 500 is periodic. That is, in each pair made of the Vchunk cycle 504 and the Pchunk cycle 505, the parcel mapping 500 is common. Since the parcel mapping 500 between the virtual storage area and the physical storage area is periodic, data can be appropriately distributed to a plurality of physical storage areas, and efficient management of the parcel mapping 500 is realized. It should be noted that a parcel mapping that is aperiodic, that is, with only one cycle, may be adopted.

An identifier of the Vchunk 401 in each Vchunk cycle 504 is represented by a Vcycle #. Therefore, the Vcycle # takes values from 0 to c−1. An identifier of the Pchunk 501 within the Pchunk cycle 505 is represented by a Pcycle #. The Pcycle # takes a value from 0 to c+m−1, assuming that the number of spare Pchunks in one the Pchunk cycle 505 is m.

The storage controller 100 allocates the Pchunk 501a belonging to one or more PPGs 205 to one Vchunk cycle 504. On the contrary, the storage controller 100 allocates one Pchunk cycle 505 to the Vchunk 401 belonging to one or more VPGs 204. A plurality of physical parcels extending over a plurality of Pchunks 501a are allocated to a data entity of a plurality of virtual parcels in one Vchunk 401.

As described above, since the Pchunk cycle 505 has the spare Pchunk 501b, the number of chunks of the Pchunk cycle 505 is larger by one or more than the number of chunks of the Vchunk cycle 504. In the example of this figure, when a formula: Pchunk # mod (c+1)=0 is satisfied, that is, when Pchunk #=k (c+1) (k is an integer of 0 or more), the Pchunk 501b of the Pchunk # is a spare area. This spare area is a reserved area to be used as a restoration destination of rebuild processing when a drive in the DG 207 to which the PPG 205 belongs fails.

It should be noted that, in the example of this figure, although there is only one spare Pchunk 501b in one drive 170 in one Pchunk cycle 505, two or more spare Pchunks 501b may be defined per Pchunk cycle 505 when it is desired to increase a ratio of the spare area to the entire system. That is, when the number of the spare Pchunk 501b per Pchunk cycle 505 is m (m is an integer of 1 or more), the number of chunks within the Pchunk cycle 505 is larger by m than the number of chunks within the Vchunk cycle 504. Further, in a case of: Pchunk #=k (c+1) to k (c+1)+m−1, the Pchunk 501b of the Pchunk # is a spare area.

A virtual spare drive (VSD) 502 is a drive that corresponds to a failed drive and does not exist as an entity. To the virtual spare drive 502, a spare area (Pcycle #=0 to m−1) that is a part of the Pchunk 501b is allocated as an area. This allocation is referred to as a spare mapping 503. The spare mapping 503 will be described later.

Next, an example with c=4, N=4, and G=3 for the parcel mapping 500 of the VPG 204 and the PPG 205 will be described. The symbol c is the number of Vchunks within the Vchunk cycle 504, N is the number of drives in the parity group (the VPG 204 and the PPG 205), and G is the number of parity groups in the DG.

By repeatedly arranging the parcel mapping for each combination of the Vchunk cycle 504 and the Pchunk cycle 505 in this manner, a scale of a mapping pattern can be reduced, and a load of generation of the mapping pattern and a load of address conversion can be suppressed.

Figure 7:
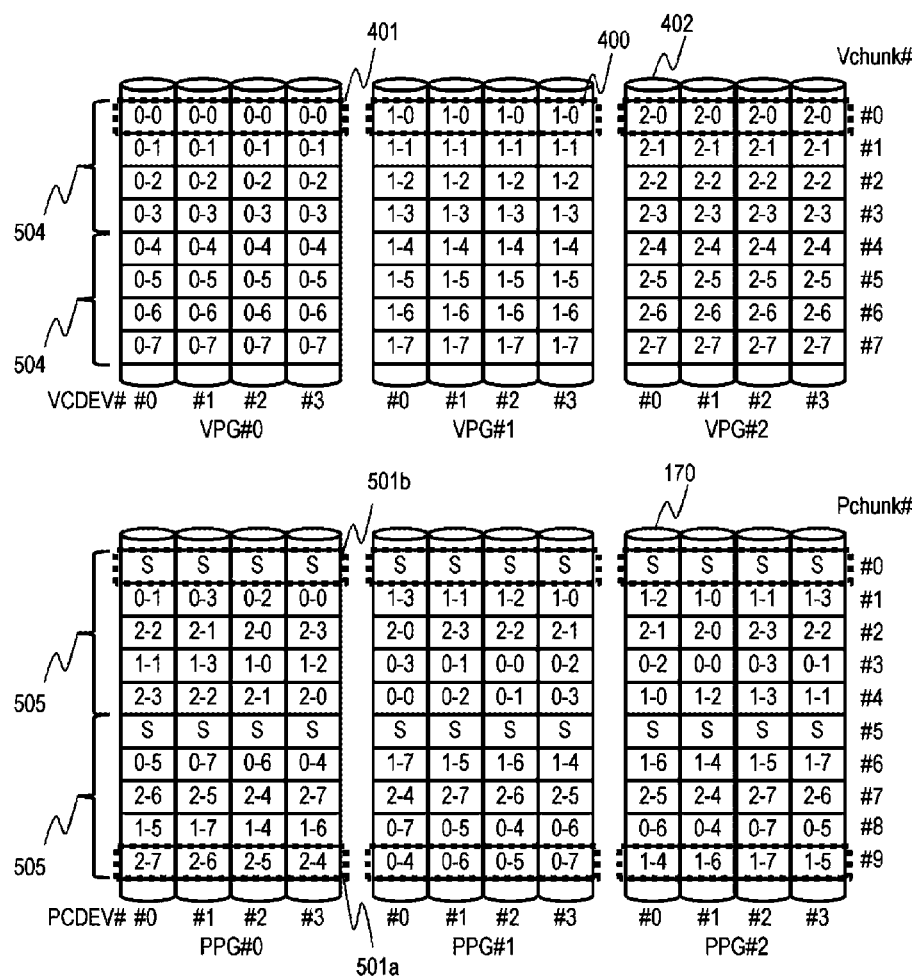
FIG. 7 shows an example of a parcel mapping of a first configuration case in which the number of physical storage drives is an integral multiple of N.
Figure 8:
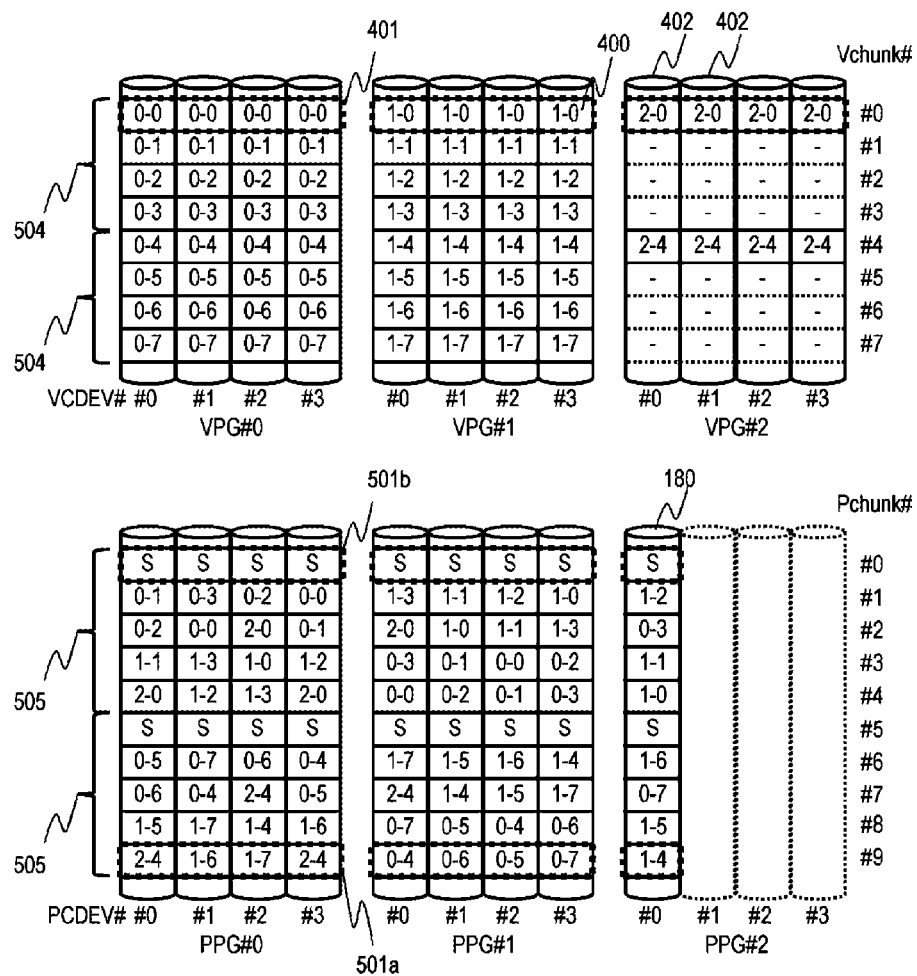
FIG. 8 shows an example of a parcel mapping of a second configuration case in which the number of physical storage drives is not an integral multiple of N.

FIG. 7 shows an example of the parcel mapping of a first configuration case in which the number of drives is an integral multiple of N. FIG. 8 shows an example of the parcel mapping of a second configuration case in which the number of drives is not an integral multiple of N.

In a Vchunk identifier "x-y" written in the virtual parcel 400 in the virtual storage drive 402 in the VPG 204, x represents a VPG #, and y represents a Vchunk #. The same Vchunk identifier is written in a physical parcel allocated to this virtual parcel 400. In each drive 170 in the PPG 205, a spare area 501b (denoted as "S") is defined. In the parcel mapping, a correspondence between a plurality of virtual parcels 400 within one Vchunk cycle 504 and a plurality of physical parcels within one Pchunk cycle 505 is referred to as a mapping pattern. For example, the mapping pattern is represented by a Vchunk identifier corresponding to each physical parcel within one Pchunk cycle 505. The mapping pattern of each Pchunk cycle 505 is common.

In the first configuration case and the second configuration case, two Vchunk cycles 504 and two Pchunk cycles 505 are shown. Each Pchunk cycle 505 (c+1=5 Pchunks) spans over three PPGs 205. In one Pchunk cycle 505, all the physical parcels except the spare area are allocated to virtual parcels within one Vchunk cycle 504. In the first configuration case, physical parcels are allocated to all virtual parcels.

In a case in which the number of drives 170 is not an integral multiple of N as in the second configuration case, the storage controller 100 does not allocate all Vchunks in the VPG 204 to pages, but allocates only a part of the Vchunks of a specific VPG 204, for a virtual stripe for a fraction. When the number of drives in the DG is: (G−1)× N+h (h is an integer from 1 to N−1), the number of Vchunks that can be allocated to one Vchunk cycle 504 is h×c/N. In the second configuration case, since c=4 and N=4, one Vchunk per Vchunk cycle 504 can be allocated.

Although c=4 in this case, c may be any integral multiple of N in order to appropriately set the mapping between the VPG and the PPG, in any case in which the number of drives 170 is not an integral multiple of N. When the number of drives of the data D in the VPG is x and the number of drives of the parity P in the VPG is y, redundancy can be represented as xD+yP before extension. According to the present embodiment, the redundancy is still xD+yP even after the extension, without change. In this way, since the number N of virtual storage drives in the VPG is equal to the number N of physical storage drives in the PPG, and the number of Vchunks within the Vchunk cycle 504 is an integral multiple of N, the physical parcels in the extended physical storage drive can be allocated to the Vchunk even when the number of physical storage drives in the DG is not an integral multiple of N, and same redundancy can be maintained as when the number of physical storage drives in the DG is an integral multiple of N.

Figure 9:
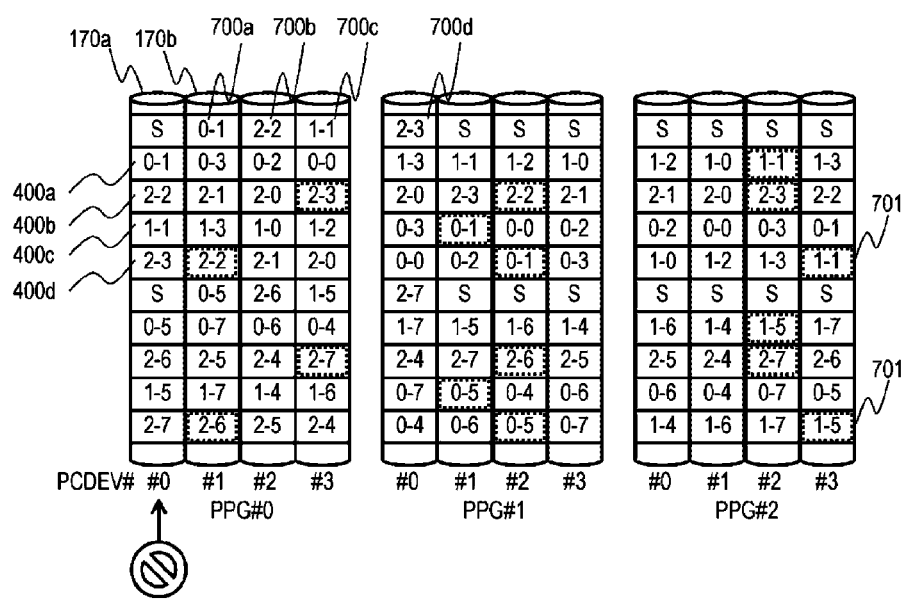
FIG. 9 shows an operation example of rebuilding at failure of one drive in the first configuration case.

FIG. 9 shows an operation example of rebuilding at failure of one drive in the first configuration case.

Here, the rebuild operation is shown when a drive 170a (a PCDEV #0 of a PPG #0) fails.

First, a virtual parcel (e.g., virtual parcel 400a) corresponding to a physical parcel included in the failed drive is arranged in a spare area (e.g., 700a) (updating of a management table). Rebuild processing is executed on the allocated spare area 700. In a 2D+2P configuration, there are three normal virtual parcels belonging to a same virtual chunk for each of the virtual parcels 400a, 400b, 400c, and 400d in the failed drive 170a. The storage controller 100 can restore lost data of the failed drive to spare areas 700a, 700b, 700c, and 700d by reading two parcels among these parcels from a normal drive 170b other than the failed drive 170a. Therefore, the storage controller 100 can limit a maximum read amount from one drive 170b of one Pchunk cycle to an amount of two parcels by selecting a virtual parcel of the two normal drives 170b from the three normal drives 170b having each virtual parcel 400 so as to reduce a deviation between all the normal drives 170b. In a conventional RAID method, since a maximum read amount from one drive for one Pchunk cycle corresponds to an amount of four parcels, a read performance in rebuilding can be doubled in the example of this figure as compared to the conventional RAID method. Similarly, while rebuilt data is written to one drive in the conventional RAID method, since rebuilt data is distributed and written to a plurality of drives in the example of this figure, a write performance in rebuilding can also be improved. As described above, the computer system of the present embodiment can improve a rebuild performance by distributing and arranging stripe data elements of the virtual chunk in the plurality of drives 170.

In the example of this figure, in order to restore the data of the eight physical parcels in the failed drive 170a, the storage controller 100 reads 16 pieces of physical parcels 701 surrounded by dotted lines, from the normal drive 170b.

Figure 10:
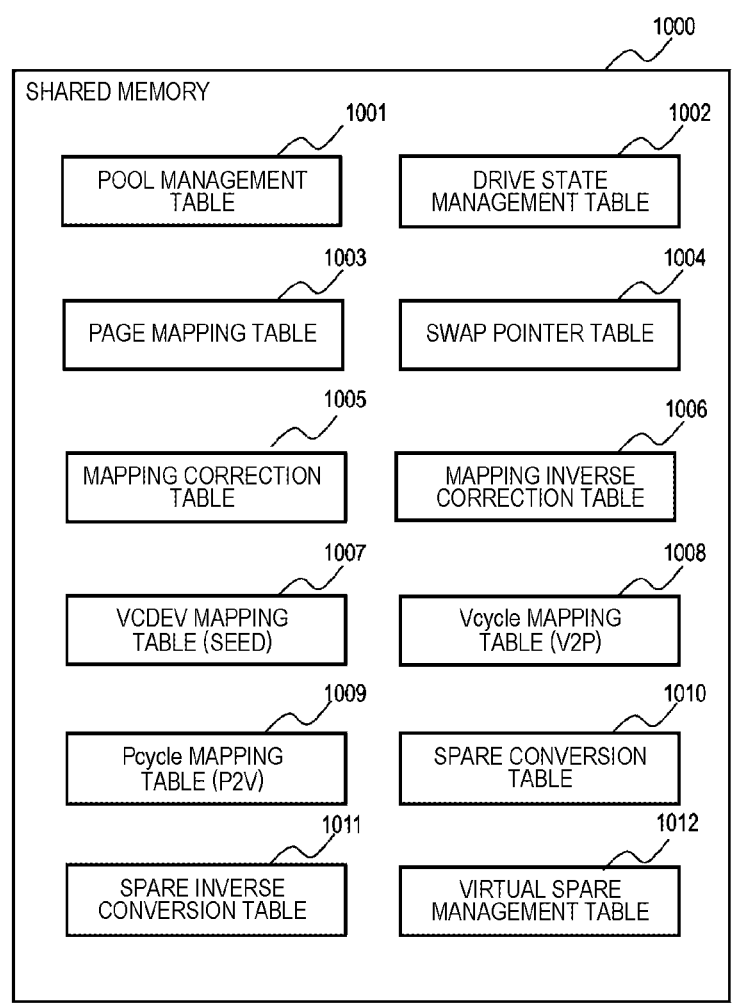
FIG. 10 shows contents of a shared memory.

FIG. 10 shows contents of a shared memory.

A shared memory 1000 is configured using at least one storage area of the physical storage drive 170, the CM 131, and the LM 122, for example. It should be noted that the storage controller 100 may configure a logical shared memory 1000 by using a storage with multiple configurations of the physical storage drive 170, the CM 131, and the LM 122, and may perform cache management for various kinds of information.

The shared memory 1000 stores a pool management table 1001, a drive state management table 1002, a page mapping table 1003, a SWAP pointer table 1004, a mapping correction table 1005, a mapping inverse correction table 1006, a VCDEV mapping table (SEED table) 1007, a Vcycle mapping table (V2P table) 1008, a Pcycle mapping table (P2V table) 1009, a spare conversion table 1010, a spare inverse conversion table 1011, and a virtual spare management table 1012.

The VCDEV mapping table 1007, the Vcycle mapping table 1008, the Pcycle mapping table 1009, the spare conversion table 1010, the spare inverse conversion table 1011, and the virtual spare management table 1012 are similar to tables shown in PTL 1. The VCDEV mapping table 1007 stores a SEED value corresponding to a combination of the VPG # and the VCDEV #. The SEED value is determined by a pseudo random number generation method such as a linear congruential method, for example. The Vcycle mapping table 1008 shows a Pchunk corresponding to a Vchunk, and shows a Vchunk represented by a combination of a VPG # and a Vcycle #, and a Pchunk represented by a combination of a PPG # and a Pcycle #. The Pcycle mapping table 1009 is a reverse lookup table of the Vcycle mapping table 1008, and shows a Vchunk corresponding to a Pchunk. The spare conversion table 1010 shows a drive allocated to a virtual chunk in a virtual spare drive. The spare inverse conversion table 1011 is a reverse lookup table of the spare conversion table 1010, and shows a virtual chunk in a virtual spare drive corresponding to a drive. The virtual spare management table 1012 includes a state indicating whether or not the virtual spare drive is in use, and includes a copy pointer indicating an LBA whose rebuilding has been completed during rebuilding of the virtual spare drive. Details of each of other tables will be described later.

In the parcel mapping, a mapping pattern when the number of drives in the DG is an integral multiple of N is referred to as a Goal mapping pattern. The Goal mapping pattern is represented by the VCDEV mapping table 1007, the Vcycle mapping table 1008, and the Pcycle mapping table 1009. The mapping pattern when the number of drives in the DG is not an integral multiple of N is represented by a Goal mapping pattern and a correction pattern for the Goal mapping pattern. The correction pattern is represented by the mapping correction table 1005 and the mapping inverse correction table 1006.

Further, in extension of a drive, a mapping pattern before the extension of a drive is referred to as a current mapping pattern (Current), and a mapping pattern after the extension is referred to as a target mapping pattern (Target). That is, at a time of single extension, the shared memory 1000 stores a Current mapping correction table 1005 with the mapping inverse correction table 1006, and a Target mapping correction table 1005 with the mapping inverse correction table 1006.

The spare mapping is managed by the spare conversion table 1010, the spare inverse conversion table 1011, and the virtual spare management table 1012.

Figure 11:
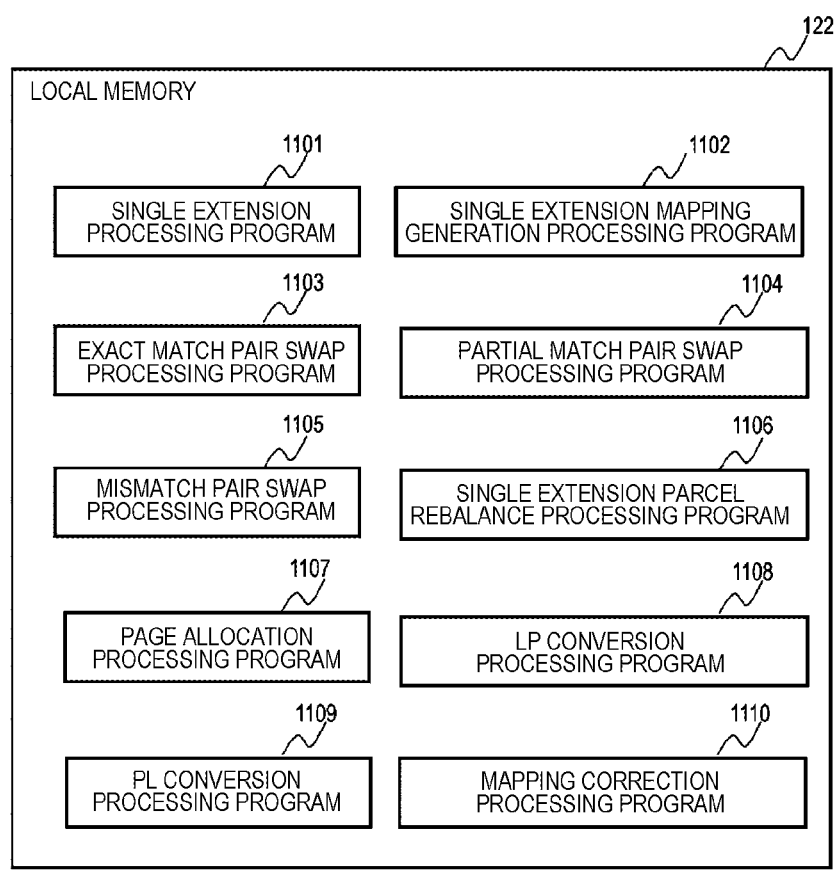
FIG. 11 shows contents of a local memory.

FIG. 11 shows contents of the local memory.

The local memory 122 stores a single extension processing program 1101, a single extension mapping generation processing program 1102, an exact match pair SWAP processing program 1103, a partial match pair SWAP processing program 1104, a mismatch pair SWAP processing program 1105, a single extension parcel rebalance processing program 1106, a page allocation processing program 1107, an LP conversion processing program 1108, a PL conversion processing program 1109, and a mapping correction processing program 1110. A specific use of each processing will be described later.

FIG. 12 shows a pool management table.

The pool management table 1001 is information indicating a correspondence among the pool 200, the Tier 206, the DG 207, and the VPG 204. The pool management table 1001 includes fields of a Pool #1200, a Tier #1201, a DG #1202, a VPG #1203, and an allocatable Vchunk number 1204.

This table allows the storage controller 100 to check an identifier of a DG 207 belonging to each Tier 206 of the pool 200, an identifier of a VPG 204 belonging to each DG 207, and an allocatable Vchunk number of each VPG 204. Since numbers (identifiers) of the VPG 204 and the PPG 205 in the DG 207 are equal, the PPG # belonging to the target DG 207 can also be known. For example, when VPG #0, #1, and #3 belong to a certain DG 207, it can be seen that PPG #0, #1, and #3 belong to this DG 207.

The allocatable Vchunk number 1203 stores values up to the Vchunk cycle 504 ($c$) based on the number of drives of the corresponding PPG 205. In the VPG 204 indicated by the VPG #1203, it is not possible to allocate a page to a Vchunk # exceeding the allocatable Vchunk number 1203 per Vchunk cycle 504. When the number of drives in the DG 1202 is D, the allocatable Vchunk number 1203 is set based on the following criteria. To the allocatable Vchunk number 1203 of the VPG extended last, c is set when D is an integral multiple of N, and a value represented a formula: (D mod N)*c/N is set when D is not an integral multiple of N. In this case, since c is an integral multiple of N, the result of the above formula is always an integer. For the allocatable Vchunk number 1203 of the remaining VPGs, c is set.

FIG. 13 shows a drive state management table.

The drive state management table 1002 is a table to manage a state of the physical storage drive 170 configuring the PPG 205. The drive state management table 1002 includes fields of a PPG #1205, a PCDEV #1206, and a state 1207. The PPG #1205 stores a PPG #. The PCDEV #1206 stores a number (physical storage drive number) of the physical storage drive 170 configuring the PPG 205 of the PPG #1205, that is, values from 0 to N−1.

The state 1207 stores a state of the physical storage drive 170 corresponding to the PPG #1205 and the PCDEV #1206. As the state of the physical storage drive 170, "normal" indicating that the physical storage drive 170 is capable of read and write accesses and is normal, "inaccessible" indicating that read or write access is disabled due to failure or the like of the physical storage drive 170, or "not mounted" indicating that the drive is not mounted are set.

FIG. 14 shows a page mapping table.

The page mapping table 1003 is information indicating a correspondence between a page of the VVOL 201 and a page of the VPG 204. The page mapping table 1003 includes fields of a Pool #1300, a VVOL #1301, a VVOL Page #1302, a VPG #1303, and a VPG Page #1304. The Pool #1300, the VVOL #1301, and the VVOL Page #1302 indicate a VVOL page. The VPG #1303 and the VPG Page #1304 indicate a VPG Page allocated to the VVOL Page. In the VPG #1303 and the VPG Page #1304 corresponding to an unused VVOL Page #1302, a value corresponding to "Not Allocated" is stored.

FIG. 15 shows a SWAP pointer table.

The SWAP pointer table 1004 includes fields of a Pool #1305, a DG #1306, a PG extension SWAP pointer 1307, and a single extension SWAP pointer 1308. This table allows the storage controller 100 to refer to a value of each SWAP pointer when a target DG is being extended.

The PG extension SWAP pointer 1307 is similar to a SWAP pointer shown in PTL 1, and represents an LBA in a VPG space of the corresponding DG. The PG extension SWAP pointer 1307 is used for extension on a PG basis, and data in an LBA before the PG extension SWAP pointer indicates that SWAP of data in PG extension processing is completed. When the storage controller 100 accesses an address of the VPG space during the PG extension processing, the storage controller 100 performs address conversion by using a mapping pattern after the extension when the address of the specified VPG space is before the PG extension SWAP pointer, and performs address conversion by using a mapping pattern before the extension when the address in the specified VPG space is after the PG extension SWAP pointer.

The single extension SWAP pointer 1308 represents an LBA in a VPG space of the corresponding DG. The single extension SWAP pointer 1308 is used for extension on a drive basis, and data in an LBA before the single extension SWAP pointer indicates that SWAP of data in single extension processing is completed. When the storage controller 100 accesses an address of the VPG space during the single extension processing, the storage controller 100 performs address conversion by using a mapping pattern after the extension when the address of the specified VPG space is before the single extension SWAP pointer, and performs address conversion by using a mapping pattern before the extension when the address in the specified VPG space is after the single extension SWAP pointer.

When a value of each SWAP pointer is an invalid value (NaN), the value indicates a state in which extension has not been performed or has been completed. Further, the value of each SWAP pointer is initialized to 0 at a start of extension processing.

FIG. 16 shows a mapping correction table.

The mapping correction table 1005 includes fields of a PPG #1400, a PCDEV #1401, and a Pcycle #1402 as an Index #, includes fields of a PPG #1403, a PCDEV #1404, and a Pcycle #1405 as a corresponding Value, and includes a field of a SWAP flag 1406.

In each entry of the mapping correction table 1005, the Index # indicates a physical parcel of a SWAP source, and the Value indicates a physical parcel of a SWAP destination. When there is no drive corresponding to the Value, a value corresponding to "NaN" is stored in the Value.

Further, a value of the SWAP flag 1406 is updated during extension processing. Specifically, during the execution of the extension processing, the storage controller 100 sets the SWAP flag 1406 to ON when it is determined that the physical parcel corresponding to the Index # is a SWAP target, and sets the SWAP flag 1406 to OFF when data SWAP processing of the physical parcel is completed.

FIG. 17 shows a mapping inverse correction table.

The mapping inverse correction table 1006 includes fields of a PPG #1407, a PCDEV #1408, and a Pcycle #1409 as an Index #, and includes fields of a PPG #1410, a PCDEV #1411, and a Pcycle #1412 as a corresponding Value.

In each entry of the mapping inverse correction table 1006, the Index # indicates a physical parcel of a SWAP destination indicated in the mapping correction table 1005, and the Value indicates a physical parcel of a SWAP source indicated in the mapping correction table 1005. When there is no drive corresponding to the Index #, a value corresponding to "NaN" is stored in the Index # of the physical parcel corresponding to the drive.

Upon setting the entry of the mapping correction table 1005, the storage controller 100 sets the information in the corresponding entry of the mapping inverse correction table 1006.

Figure 18:
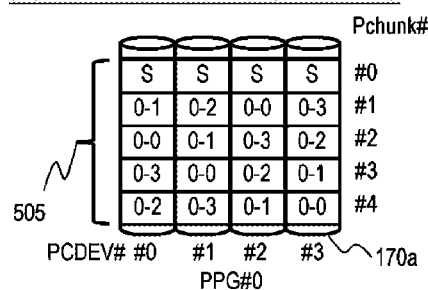
FIG. 18 shows a first extension case of single extension processing.
Figure 18:
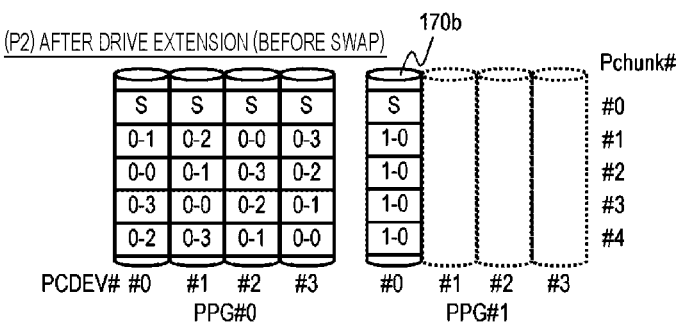
Figure 18:
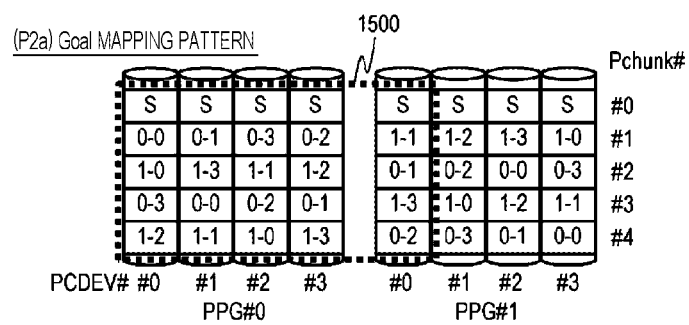
Figure 18:
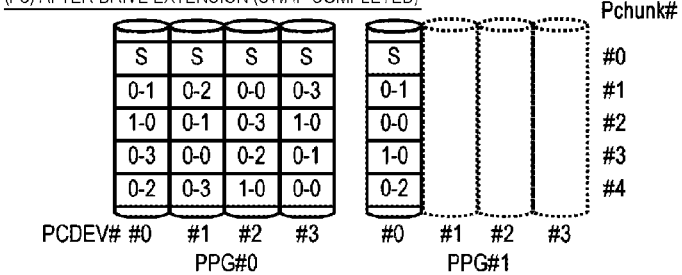

FIG. 18 shows a first extension case of the single extension processing.

Extension processing on a drive basis is referred to as single extension processing. The first extension case shows an example of changing from a state of PG=1 and the number of drives=4, to a state of PG=2 and the number of drives=5, by adding one drive in a configuration of c=4 and N=4.

P1 indicates a current mapping pattern, which is an initial mapping pattern before extension of the drive. It should be noted that, for the sake of simplicity, only one Pchunk cycle 505 is shown in the example of this figure. In this state, when one drive is blocked, the number of the spare areas, which is three, in the normal drive in the PPG for restoring the data of the drive becomes smaller than the number of data areas in the blocked drive, which is four. Therefore, at the stage of P1, the storage controller 100 cannot store data yet.

P2 indicates a current mapping pattern immediately after the extension of the drive. In this state, in the current mapping pattern, four physical parcels in a newly added drive 170b and one virtual chunk indicated by a Vchunk identifier "1-0" are added to the current mapping pattern. Further, the current mapping pattern indicates that the four added physical parcels are to be allocated to the added virtual chunk. When the virtual chunk is permitted to be allocated to the VVOL page, the data allocated to this virtual chunk will be lost when the newly added drive 170b is blocked. Therefore, at the stage of P2, the storage controller 100 cannot allocate the virtual chunk corresponding to the newly added drive 170b, to the VVOL page.

It should be noted that, since c=N in the example of this figure, only one Vchunk is allocated to the drive 170b to be extended at P2 immediately after the extension of the drive, but k pieces of Vchunks are allocated to the drive 170b to be extended in the initial state when c=kN (k is any integer of 1 or more).

P2a is a mapping pattern that is to be a target in executing parcel rebalance processing to be described later. Hereinafter, this mapping pattern is referred to as "Goal mapping pattern (or simply referred to as Goal mapping, Goal)". The Goal mapping pattern is a mapping pattern generated under a condition of: number of drives=N×{number of PGs after extension}. The example in this figure shows the Goal mapping pattern in a case of PG=2 and the number of drives=8. A method for creating the Goal mapping pattern may be a method described in PTL 1, or a mapping method in a distributed RAID method in which extension is performed on other PG basis. For example, the storage controller 100 may generate the Goal mapping pattern by determining a physical parcel to be allocated to a virtual parcel based on generation of a pseudo random number or based on a preset random number table. The Goal mapping pattern may be preset in the storage controller 100. An arrangement of the virtual chunks in the plurality of drives 170 according to the Goal mapping pattern optimally distributes a load of the I/O to the plurality of drives 170. Further, the arrangement is suitable for speeding up the rebuild processing.

Thereafter, among the Goal mapping patterns, based on mapping information 1500 in a range corresponding to the number of drives after the extension, the storage controller 100 generates a mapping pattern of P3 by using a mapping pattern generation method after extension, to be described later. After generating this mapping pattern, the storage controller 100 performs the data SWAP processing for moving data in accordance with the mapping pattern, and completes the extension processing. However, in the state of P3, actual data movement is not performed since no data is stored yet. This state allows the same redundancy to be secured as that in extension on a PG basis, and enables rebuilding of data of the drive even if any drive fails. After completing the data SWAP processing, the storage controller 100 permits allocation of all VPG Pages in the virtual chunk corresponding to the DG 207 to be extended, to the VVOL page.

A minimum configuration in the conventional distributed RAID system cannot be operated on one PG, and there are two PGs for a reason described with P1. Whereas, a minimum configuration of the computer system of the present embodiment is one PG and one drive as indicated by P2 and P3. Thus, the initial cost can be reduced.

Figure 19:
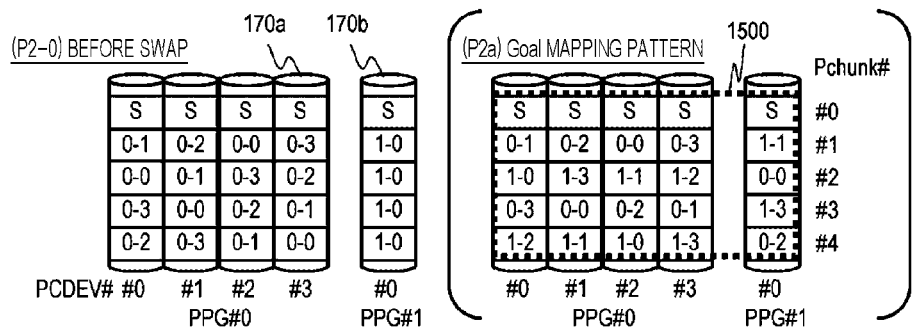
FIG. 19 shows a concept of a mapping pattern generation method in the first extension case.
Figure 19:
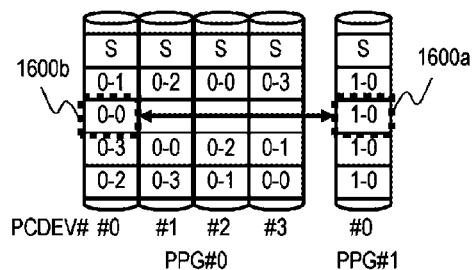
Figure 19:
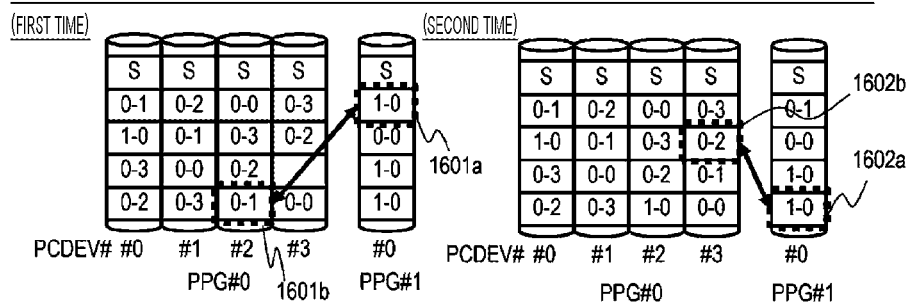
Figure 19:
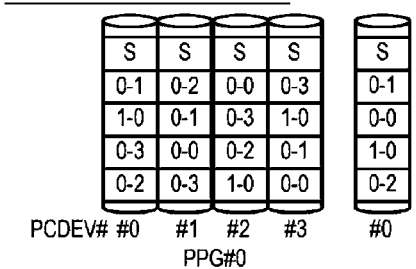

FIG. 19 shows a concept of a mapping pattern generation method in the first extension case.

P2-0 indicates an initial current mapping pattern. P2a indicates the Goal mapping pattern.

First, the storage controller 100 selects a physical parcel pair, which is two physical parcels, acquires two Vchunk identifiers respectively associated with the two physical parcels from the current mapping pattern, searches for a physical parcel pairs having both Vchunk identifiers being coincident with the Goal mapping pattern when the two Vchunk identifiers are subjected to SWAP, and performs SWAP of the physical parcel pair when such a physical parcel pair exists.

In P2-1, a physical parcel 1600a is associated with a Vchunk identifier "1-0" in the current mapping pattern, and is associated with a Vchunk identifier "0-0" in the Goal mapping pattern. Whereas, a physical parcel 1600b is associated with a Vchunk identifier "0-0" in the current mapping pattern, and is associated with a Vchunk identifier "1-1" in the Goal mapping pattern. Accordingly, the storage controller 100 can cause the Vchunk identifier corresponding to both in the physical parcel pair (1600a, 1600b) to coincide with the Goal mapping pattern by performing SWAP of the physical parcel pair (1600a, 1600b). Thus, SWAP is performed.

Even if SWAP is performed on the physical parcel pair satisfying a condition of P2-1 for all physical parcels, when there are one or more drives 170 with two or more physical parcels corresponding to a same Vchunk identifier, the storage controller 100 searches for a physical parcel pair in which only one Vchunk identifier after SWAP coincides with the Goal mapping pattern, and performs SWAP of the physical parcel pair when such a physical parcel pair exists.

At a first time of P2-2, a physical parcel 1601a is associated with the Vchunk identifier "1-0" in the current mapping pattern, and is associated with the Vchunk identifier "1-1" in the Goal mapping pattern. Whereas, a physical parcel 1601b is associated with a Vchunk identifier "0-1" in the current mapping pattern, and is associated with a Vchunk identifier "1-0" in the Goal mapping pattern. Accordingly, the storage controller 100 can cause the Vchunk identifier corresponding to the physical parcel 1601b to coincide with the Goal mapping pattern by performing SWAP of the physical parcel pair (1601a, 1601b). Thus, SWAP is performed.

Similarly, at a second time of P2-2, the storage controller 100 can cause the Vchunk identifier corresponding to the physical parcel 1602a to coincide with the Goal mapping pattern by performing SWAP of the physical parcel pair (1602a, 1602b). Thus, SWAP is performed.

It should be noted that, in P2-1 and P2-2, the storage controller 100 does not select, as a SWAP target, a physical parcel pair in which any Vchunk identifier before SWAP coincides with the Goal mapping pattern.

In the example of this figure, the storage controller 100 can generate a mapping pattern after the extension by executing the processing of P2-2. Even if SWAP of the physical parcel pair satisfying a condition of P2-2 among all the physical parcels is performed, when there are one or more drives 170 with two or more physical parcels corresponding to a same Vchunk identifier, the storage controller 100 searches for a physical parcel pair in which both Vchunk identifiers after SWAP do not coincide with the Goal mapping pattern, and performs SWAP of the physical parcel pair.

It should be noted that, also in this processing, similarly to P2-2, the storage controller 100 does not select, as a SWAP target, physical parcels with any Vchunk identifier before SWAP being coincident with the Goal mapping pattern. The storage controller 100 generates the current mapping pattern of P3 through the above processing.

For example, since a distributed RAID system such as disclosed in PTL 1 is based on the assumption that the number of drives is an integral multiple of N, the system is designed such that dispersion of a load and the like at a time of I/O is to be optimized when the number of drives is an integral multiple of N. Whereas, in the distributed RAID system of the present embodiment, when the number of drives is not an integral multiple of N, dispersion of a load and the like at a time of I/O is not optimized slightly.

However, as in the present embodiment, by the storage controller 100 setting the Goal mapping pattern and generating the current mapping pattern so as to coincide with the Goal mapping pattern as much as possible, an effect of dispersion when the number of drives is not an integral multiple of N can be close to the optimum, and an effect of the above optimization can be obtained with a minimum amount of movement when the number of drives becomes an integral multiple of N.

Figure 20:
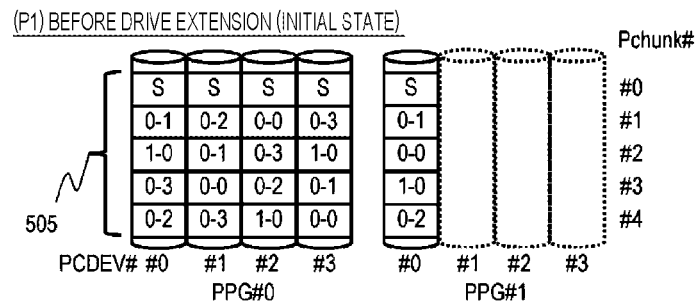
FIG. 20 shows a second extension case of single extension processing.
Figure 20:
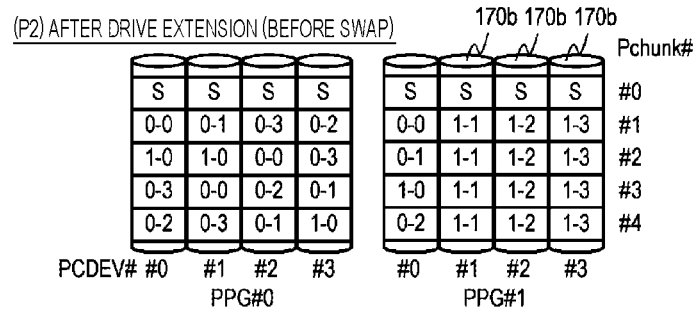
Figure 20:
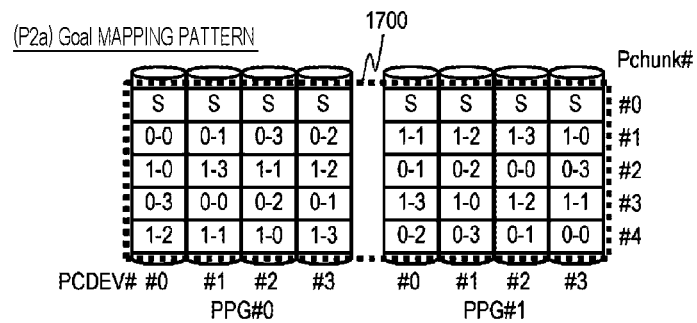
Figure 20:
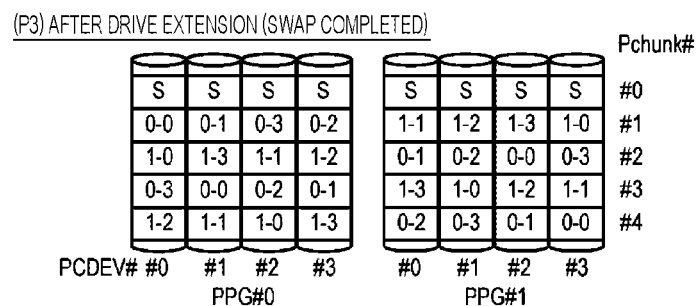

FIG. 20 shows a second extension case of the single extension processing.

In the first extension case described above, extension is performed on a drive basis from a case in which the number of drives is an integral multiple of N. Even when the number of drives is not an integral multiple of N as in the second extension case in this figure, it is possible to perform extension on a drive basis by a similar method to that in the first extension case.

P1 indicates a current mapping pattern before extension. The number of drives in the DG before extension is five, which is not an integral multiple of N. As shown in P2, when the number of drives after extension becomes an integral multiple of N by adding three drives 170b, a mapping pattern after the extension shown in P3 can be completely matched with a Goal mapping pattern 1700 shown in P2a through the mapping generation processing described above.

Hereinafter, detail of an operation of the storage controller 100 will be described.

Figure 21:
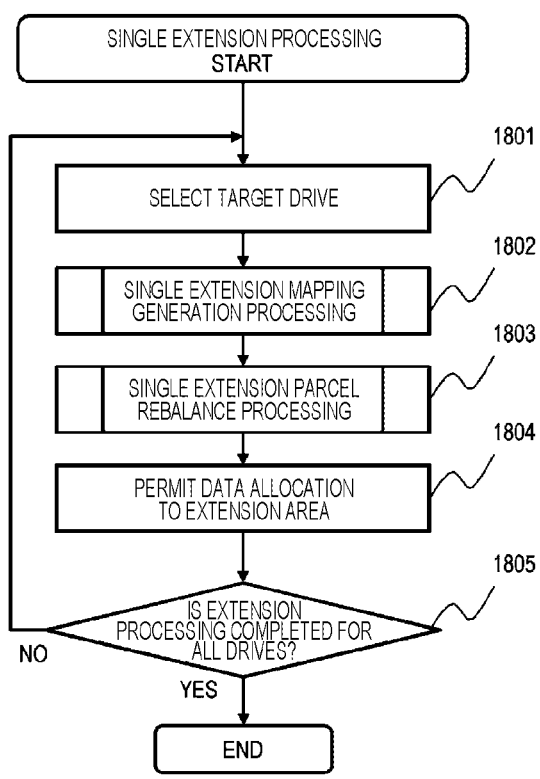
FIG. 21 shows single extension processing.

FIG. 21 shows the single extension processing.

The single extension processing program 1101 executes the single extension processing in extension of a drive on a drive basis. After adding an extensional drive to a system, an administrator inputs, to the management server 20, an extension instruction for the DG on a drive basis. The storage controller 100 executes the single extension processing at a timing of receiving the extension instruction from the management server 20.

First, the single extension processing program 1101 selects any one drive as a target drive from among extensional drives (step 1801). Here, steps 1802 to 1804 are referred to as drive extension processing. For example, the single extension processing program 1101 may select the target drive from drives not yet subjected to the drive extension processing among the extensional drives, in an ascending order of a physical storage drive # in the system.

Next, the single extension processing program 1101 executes single extension mapping generation processing (step 1802). The single extension mapping generation processing will be described later.

Next, the single extension processing program 1101 executes single extension parcel rebalance processing (step 1803). The single extension parcel rebalance processing will be described later.

Next, the single extension processing program 1101 permits allocation of a Vchunk corresponding to the target drive to the virtual volume (step 1804).

It should be noted that, in an example shown in the figure, data allocation of the entire extensional drive is permitted after the parcel rebalance processing of the entire extensional drive is completed. However, the data allocation of a certain area may be permitted each time parcel rebalancing of the certain area in the single drive is completed.

Next, the single extension processing program 1101 determines whether or not the drive extension processing has been completed for all the extensional drives added to the system (step 1805). When the drive extension processing has not been completed for all the extensional drives (No in step 1805), the single extension processing program 1101 returns to step 1801, executes similar processing for the next target drive, and ends the processing when the drive extension processing has been completed for all the extensional drives (Yes in step 1805).

Figure 22:
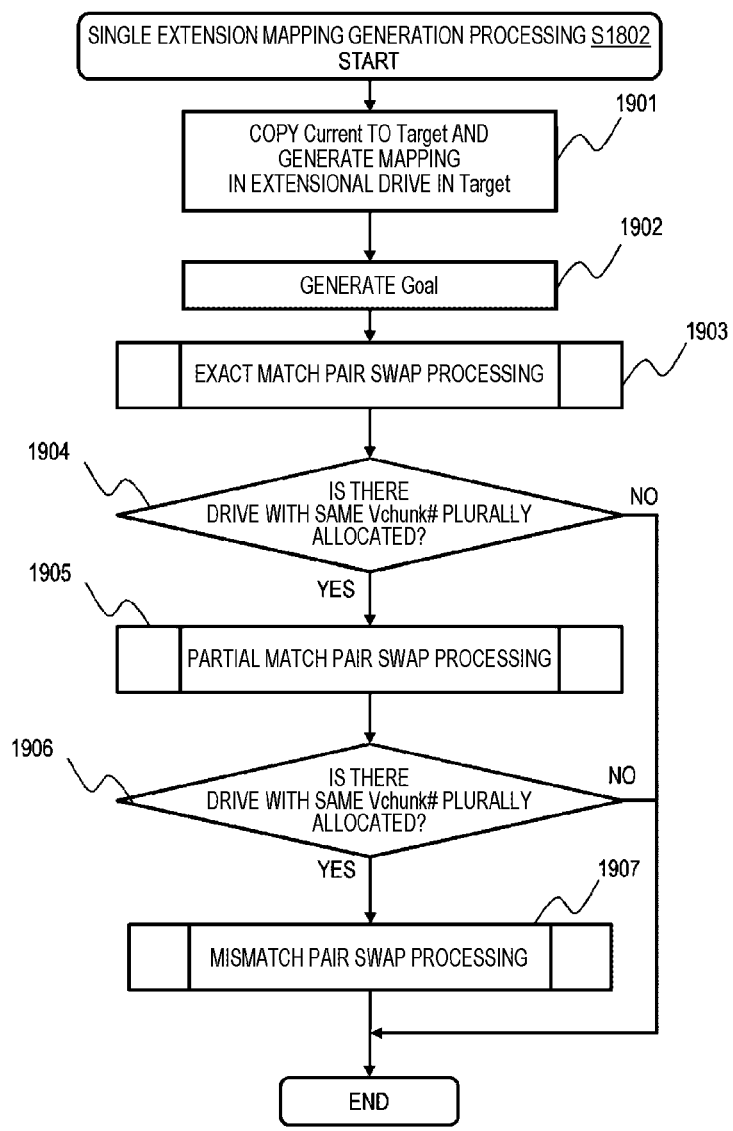
FIG. 22 shows single extension mapping generation processing.

FIG. 22 shows the single extension mapping generation processing.

The single extension mapping generation processing program 1102 executes the single extension mapping generation processing for generating a mapping pattern after extension in step 1802 of the above single extension processing.

First, the single extension mapping generation processing program 1102 copies the current mapping pattern (Current) before extension to the mapping pattern (Target), and then generates a mapping in an extensional drive in the Target (step 1901). In the present embodiment, since the cycle Vchunk number c is an integral multiple of N, kN pieces of physical parcels per Pchunk cycle are created for the extensional drive except for a spare parcel when c=kN while k is an integer. As described above, at a time of generating the mapping pattern in the extensional drive, since data loss occurs when the extensional drive is blocked, a Vchunk corresponding to this extensional drive cannot be allocated to the virtual volume.

Next, the single extension mapping generation processing program 1102 generates a Goal mapping pattern (Goal) (step 1902). The Goal mapping pattern is a target mapping pattern and is a mapping pattern generated under a condition of: number of drives=N×{number of PGs after extension}.

Next, the single extension mapping generation processing program 1102 executes exact match pair SWAP processing for performing SWAP of Vchunk identifiers of a physical parcel pair (exact match pair) in which both of the two Vchunk identifiers after SWAP coincide with the Goal (step 1903). Details of the exact match pair SWAP processing will be described later. It should be noted that the SWAP of Vchunk identifiers is update processing of the mapping correction table and the mapping inverse correction table, and the SWAP of data of an actual physical parcel pair is performed by the single extension parcel rebalance processing to be described later.

Next, the single extension mapping generation processing program 1102 determines whether or not a plurality of physical parcels in one drive are allocated to a same Vchunk (step 1904). When there is no drive in which a plurality of physical parcels in one drive are allocated to a same Vchunk (No in step 1904), the single extension mapping generation processing program 1102 ends the processing.

When there are one or more drives in which a plurality of physical parcels in one drive are allocated to a same Vchunk (Yes in step 1904), the single extension mapping generation processing program 1102 executes partial match pair SWAP processing for performing SWAP of Vchunk identifiers of a physical parcel pair (partial match pair) in which one of the two Vchunk identifiers after SWAP coincides with the Goal (step 1905). Details of the partial match pair SWAP processing will be described later.

Next, the single extension mapping generation processing program 1102 determines whether or not a plurality of physical parcels in one drive are allocated to a same Vchunk (step 1906). When there is no drive in which a plurality of physical parcels in one drive are allocated to a same Vchunk (No in step 1906), the single extension mapping generation processing program 1102 ends the processing.

When there are one or more drives in which a plurality of physical parcels in one drive are allocated to a same Vchunk (Yes in step 1906), the single extension mapping generation processing program 1102 executes mismatch pair SWAP processing for performing SWAP of Vchunk identifiers of a physical parcel pair (mismatch pair) in which both of the two Vchunk identifiers after SWAP do not coincide with the Goal (step 1907). Details of the mismatch pair SWAP processing will be described later.

Figure 23:
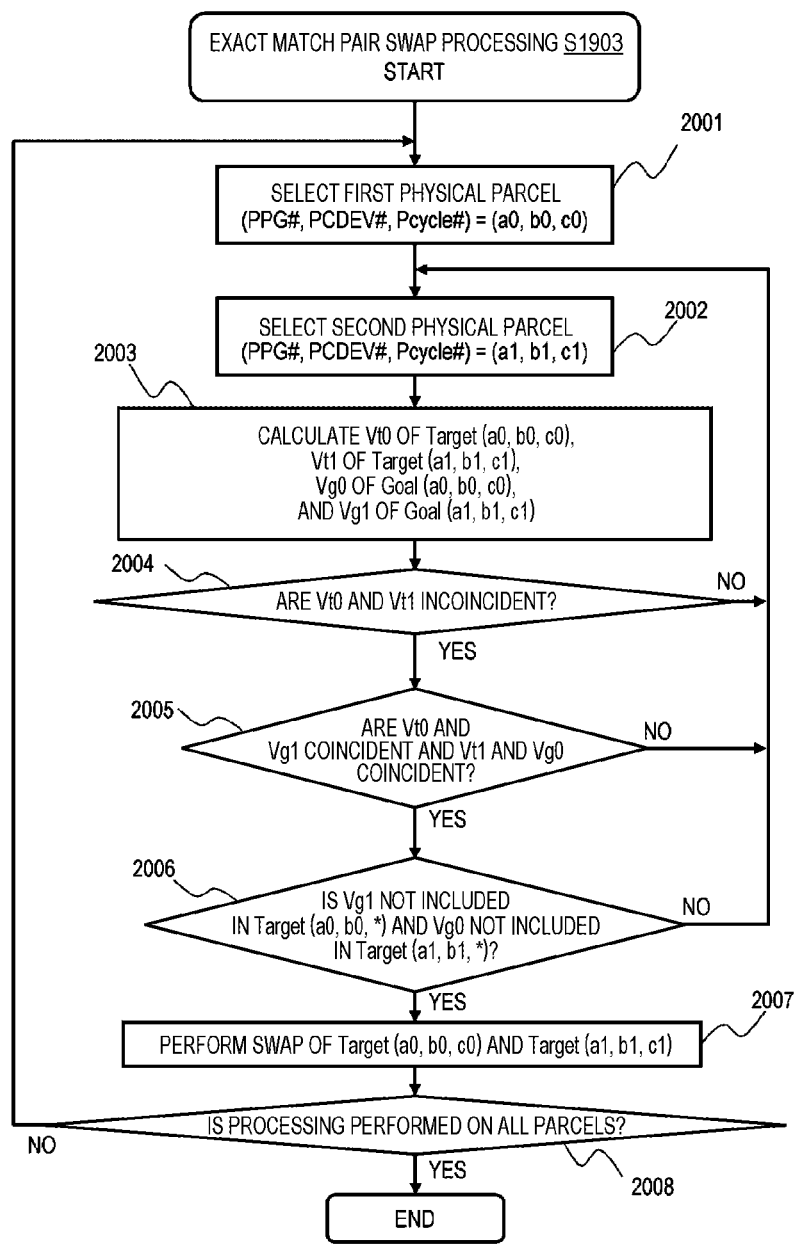
FIG. 23 shows exact match pair SWAP processing.

FIG. 23 shows the exact match pair SWAP processing.

The exact match pair SWAP processing program 1103 executes the exact match pair SWAP processing in step 1903 of the single extension mapping generation processing described above.

First, the exact match pair SWAP processing program 1103 selects a first physical parcel (step 2001). In a method of selecting the first physical parcel, for example, physical parcels are selected in an ascending order of the PPG #, the PCDEV #, and the Pcycle # in the target DG. Hereinafter, the first physical parcel is set as (PPG #, PCDEV #, Pcycle #)=(a0, b0, c0). Further, in the following description, a Vchunk identifier corresponding to a physical parcel of (PPG #, PCDEV #, Pcycle #)=(A, B, C) in a mapping pattern XXX is referred to as XXX (A, B, C) (e.g., Target (a0, b0, c0)).

Next, the exact match pair SWAP processing program 1103 selects a second physical parcel, which is a physical parcel forming the target pair with the first physical parcel selected in step 2001 (step 2002). In a method of selecting the second physical parcel, for example, excluding the first physical parcel selected in step 2001, physical parcels are selected in an ascending order of the PPG #, the PCDEV #, and the Pcycle # in the target DG. Hereinafter, the second physical parcel is set as (PPG #, PCDEV #, Pcycle #)=(a1, b1, c1).

Next, the exact match pair SWAP processing program 1103 acquires Vt0 of a Target (a0, b0, c0) and Vt1 of a Target (a1, b1, c1) from the Target, and acquires Vg0 of a Goal (a0, b0, c0) and Vg1 of a Goal (a1, b1, c1) from the Goal, (step 2003).

Next, the exact match pair SWAP processing program 1103 determines whether or not Vt0 and Vt1 are coincident (step 2004). When Vt0 and Vg1 are coincident (No in step 2004), since there is no change in the mapping pattern even if the target pair is subjected to SWAP, the exact match pair SWAP processing program 1103 returns to step 2002 and reselects the second physical parcel.

Next, the exact match pair SWAP processing program 1103 determines whether or not Vt0 and Vg1 are coincident and Vt1 and Vg0 are coincident (step 2005). When at least any one of the fact that Vt0 and Vg1 are coincident or that Vt1 and Vg0 are coincident is not satisfied (No in step 2005), the exact match pair SWAP processing program 1103 returns to step 2002 and reselects the second physical parcel since the target pair is not an exact match pair.

When Vt0 and Vg1 are coincident and Vt1 and Vg0 are coincident (Yes in step 2005), the exact match pair SWAP processing program 1103 executes Vchunk overlap determination (step 2006). When a plurality of physical parcels in a certain drive correspond to a same Vchunk, redundancy of the Vchunk is lowered. Therefore, when performing SWAP of Vchunk identifiers, the storage controller 100 makes sure that the Vchunk identifiers corresponding to one drive after SWAP do not overlap. In other words, in the Vchunk overlap determination, the exact match pair SWAP processing program 1103 determines that a plurality of physical parcels in a certain drive do not correspond to a same Vchunk when the mapping condition is satisfied.

Specifically, in the Target, it is determined whether or not all of the Target (a0, b0, *) do not coincide with Vg1, and all of Target (a1, b1, *) do not coincide with Vg0. The Target (a0, b0, *) indicate Vchunk identifiers corresponding to all the Pcycle # with the PPG # of a0 and the PCDEV # of b0. When any one of the facts that any of the Target (a0, b0, *) coincides with Vg1 or that any of the Target (a1, b1, *) coincides with Vg0 is satisfied (No in step 2006), the exact match pair SWAP processing program 1103 returns to step 2002 and reselects the second physical parcel.

When all of the Target (a0, b0, *) do not coincide with Vg1 and all of the Target (a1, b1, *) do not coincide with Vg0, the exact match pair SWAP processing program 1103 performs SWAP of the Target (a0, b0, c0) and the Target (a1, b1, c1) (step 2007). Specifically, in the mapping correction table 1005 and the mapping inverse correction table 1006, the exact match pair SWAP processing program 1103 sets the Value in the entry whose Index # is (a0, b0, c0) to (a1, b1, c1), and sets the Value in the entry whose Index # is (a1, b1, c1) to (a0, b0, c0). Further, the exact match pair SWAP processing program 1103 sets a SWAP flag ON, of the entry of the first physical parcel in the mapping correction table 1005.

Next, the exact match pair SWAP processing program 1103 determines whether or not the processing of step 2001 to step 2007 has been executed for all the physical parcels in the target DG (step 2008). In a case in which there is a physical parcel that has not been subjected to the processing (No in step 2008), the exact match pair SWAP processing program 1103 returns to step 2001, selects the next first physical parcel, and continues the processing. When there is no physical parcel that has not been subjected to the processing (Yes in step 2008), the exact match pair SWAP processing program 1103 ends the processing.

Figure 24:
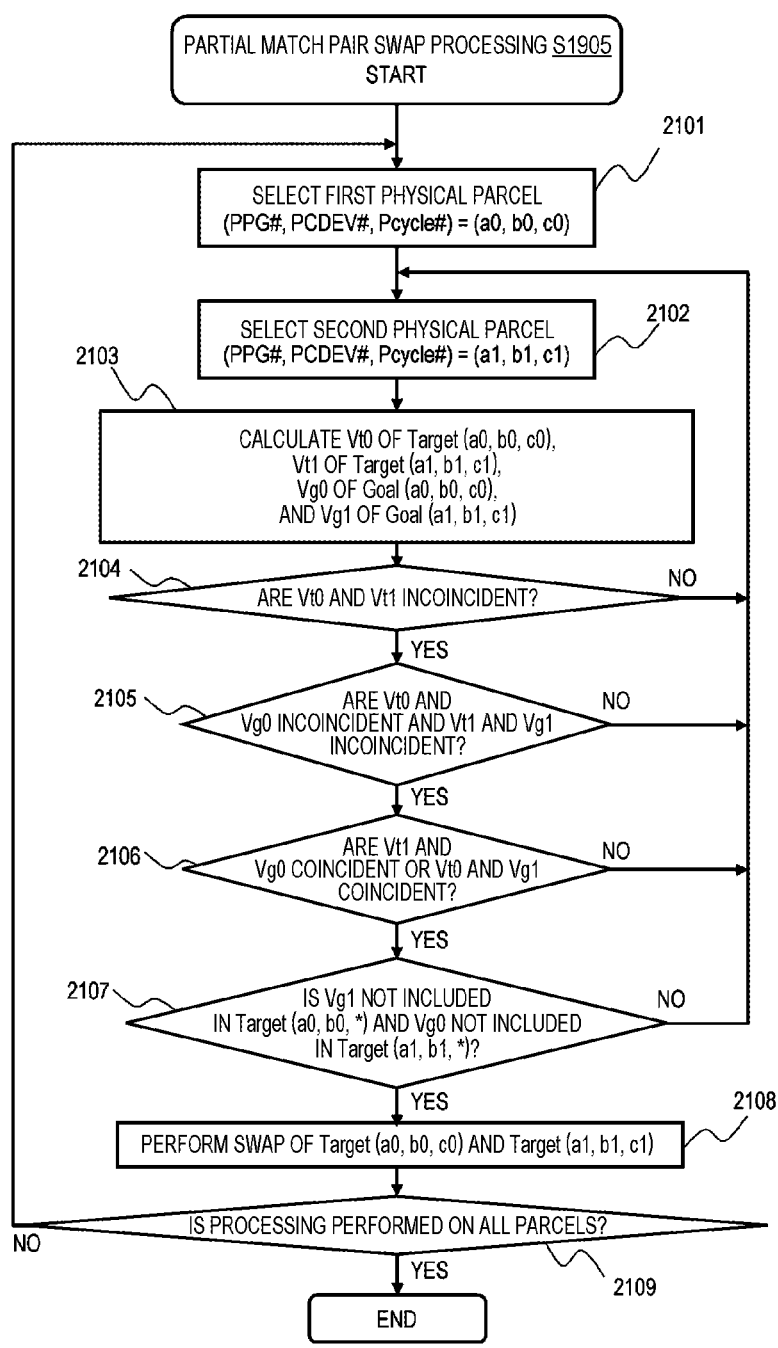
FIG. 24 shows partial match pair SWAP processing.

FIG. 24 shows the partial match pair SWAP processing.

The partial match pair SWAP processing program 1104 executes the partial match pair SWAP processing in step 1905 of the single extension mapping generation processing described above.

Steps 2101 to 2104 in the partial match pair SWAP processing are similar to steps 2001 to 2004 in the exact match pair SWAP processing, respectively, and thus description thereof will be omitted.

When it is determined YES in step 2104, the partial match pair SWAP processing program 1104 determines whether or not Vt0 and Vg0 are incoincident and Vt1 and Vg1 are incoincident (step 2105). When at least one of the facts that Vt0 and Vg0 are coincident or that Vt1 and Vg1 are coincident (No in step 2105) is satisfied, the Target and the Goal of at least one of the physical parcels are coincident. Consequently, SWAP is unnecessary for the target pair, and the partial match pair SWAP processing program 1104 returns to step 2102 and reselects the second physical parcel.

When Vt0 and Vg0 are incoincident and Vt1 and Vg1 are incoincident (Yes in step 2105), the partial match pair SWAP processing program 1104 determines whether or not Vt0 and Vg1 are coincident or Vt1 and Vg0 are coincident (step 2106). It should be noted that, since SWAP has already been performed on a pair in which Vt0 and Vg1 are coincident and Vt1 and Vg0 are coincident in the exact match pair SWAP processing, such a pair does not exist at the time of step 2106.

When Vt0 and Vg1 are incoincident and Vt1 and Vg0 are incoincident (No in step 2106), the target pair is not a partial match pair. Therefore, the partial match pair SWAP processing program 1104 returns to step 2102 and reselects a SWAP pair parcel.

When Vt0 and Vg1 are coincident or Vt1 and Vg0 are coincident (Yes in step 2106), the partial match pair SWAP processing program 1104 executes processing of the following steps 2107 to 2109. Since the processing of those is similar to that of step 2006 to step 2008 in the exact match pair SWAP processing, respectively, description thereof will be omitted.

Figure 25:
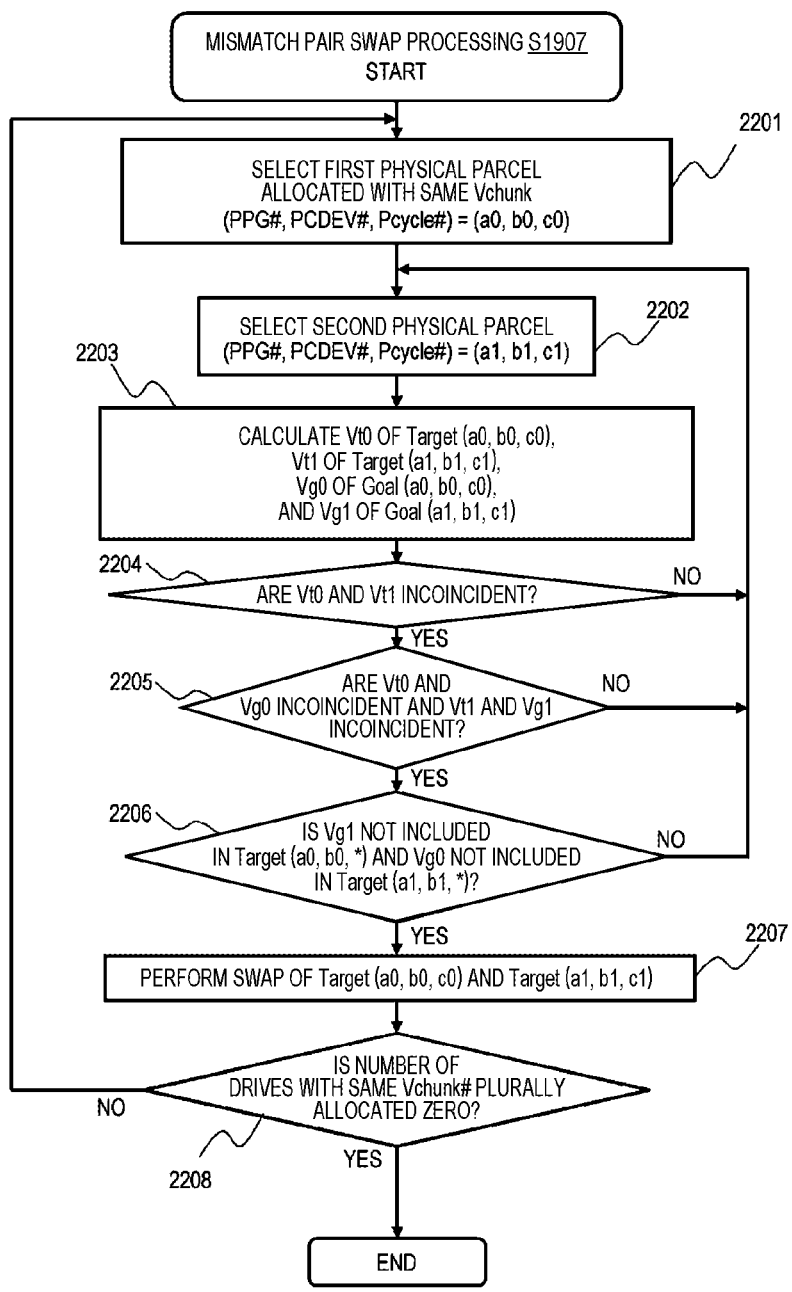
FIG. 25 shows mismatch pair SWAP processing.

FIG. 25 shows the mismatch pair SWAP processing.

The mismatch pair SWAP processing program 1105 executes the mismatch pair SWAP processing in step 1907 of the single extension mapping generation processing described above.

Steps 2201 to 2208 in the mismatch pair SWAP processing are similar to steps 2001 to 2005 and steps 2006 and 2007 in the exact match pair SWAP processing, respectively, and thus description thereof will be omitted.

Next, the mismatch pair SWAP processing program 1105 determines whether or not a same Vchunk identifier is allocated to a plurality of physical parcels in one drive (step 2208). When there is at least one drive in which a same Vchunk identifier is allocated to a plurality of physical parcels in one drive (Yes in step 2208), the mismatch pair SWAP processing program 1105 returns to step 2201 and repeats until this state disappears. When there is no drive in which a same Vchunk identifier is allocated to a plurality of physical parcels in one drive (No in step 2208), the mismatch pair SWAP processing program 1105 ends the processing.

According to the single extension mapping generation processing described above, by executing the exact match pair SWAP processing, the partial match pair SWAP processing, and the mismatch pair SWAP processing, the storage controller 100 can create a Target that satisfies the mapping condition and is close to the Goal mapping pattern, and can create the mapping correction table 1005 and the mapping inverse correction table 1006 that represent a difference between the Goal mapping pattern and the Target.

It should be noted that, in the exact match pair SWAP processing, the partial match pair SWAP processing, and the mismatch pair SWAP processing, the storage controller 100 may sequentially select virtual chunks or virtual parcels instead of sequentially selecting physical parcels.

Figure 26:
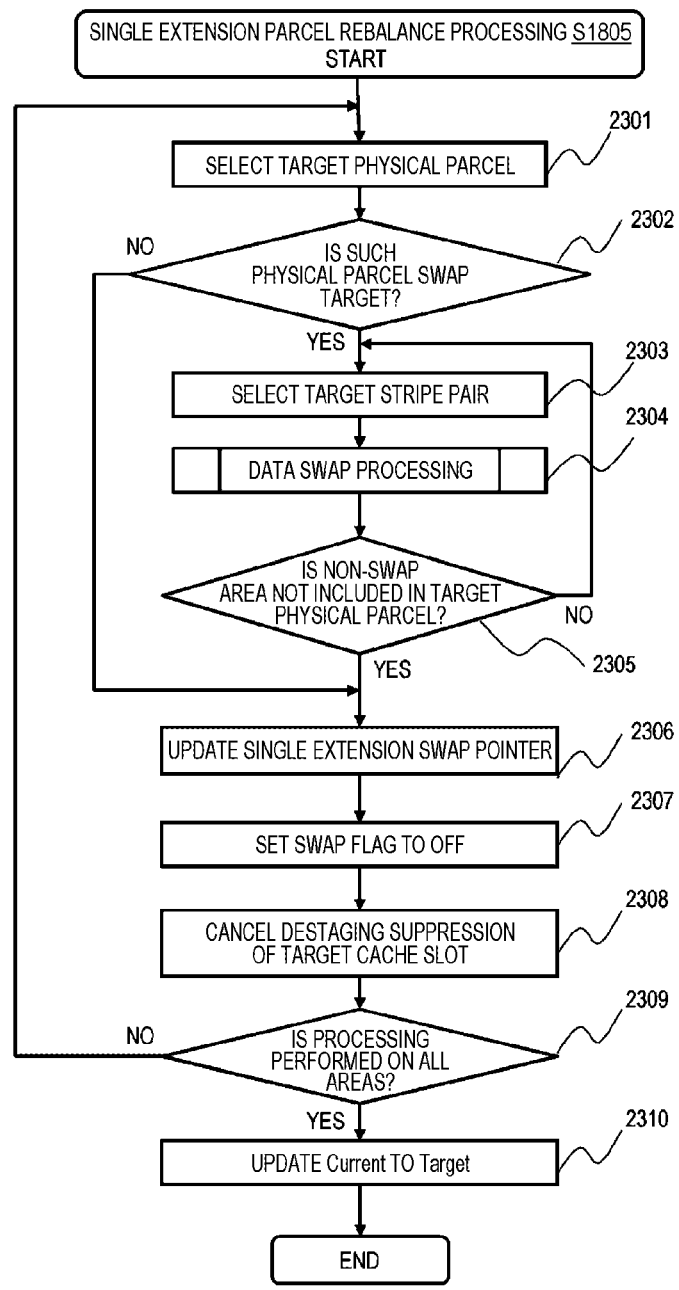
FIG. 26 shows parcel rebalance processing.

FIG. 26 shows the single extension parcel rebalance processing.

The single extension parcel rebalance processing program 1106 executes the single extension parcel rebalance processing in step S1805 of the single extension processing described above. The single extension parcel rebalance processing changes a data arrangement indicated by the current mapping pattern (Current) to a data arrangement indicated by the target mapping pattern (Target), by executing the data SWAP processing described later.

First, the single extension parcel rebalance processing program 1106 sequentially selects one physical parcel in an DG to be extended, as a target physical parcel (step 2301). For example, the single extension parcel rebalance processing program 1106 may selects, as the physical parcel, from among the physical parcels in all the drives in the DG, physical parcels that have not been subjected to the data SWAP processing, in an ascending order of the physical storage drive # and the Pcycle # in the system.

Next, the single extension parcel rebalance processing program 1106 determines whether or not the target physical parcel is a SWAP target (step 2302). Specifically, by referring to the mapping correction table 1005, and referring to the SWAP flag of the entry whose Index # is the target physical parcel, it is determined whether or not the SWAP flag is ON. When the SWAP flag of the target physical parcel is ON, this means that the target physical parcel is the SWAP target. In this case, a pair made of the target physical parcel and a SWAP destination physical parcel indicated in the Value of the entry of the target physical parcel is set as a SWAP target pair. When it is determined that the target physical parcel is the SWAP target (Yes in step 2302), the single extension parcel rebalance processing program 1106 selects two Vchunks allocated with the SWAP target pair as a target Vchunk pair, and sequentially selects virtual stripes in the target Vchunk pair as a target stripe pair (step 2303).

Next, the single extension parcel rebalance processing program 1106 executes the data SWAP processing on the target stripe pair (step 2304). The data SWAP processing is similar to processing shown in PTL 1. In the data SWAP processing, when at least one of the target stripe pair stores valid data, data is exchanged in the target stripe pair. For example, when at least one virtual stripe of the target stripe pair is allocated to a VVOL page, the data SWAP processing stages data from the physical stripe corresponding to this virtual stripe in the Current to a target cache slot corresponding to this VVOL page, suppresses destaging of the target cache slot (writing from the CM 131 into the drive 170), and sets the target cache slot to dirty. When the destaging suppression is canceled after the data SWAP processing, the data stored in the target cache slot is asynchronously destaged to the physical stripe corresponding to the virtual stripe in the Target.

Next, the single extension parcel rebalance processing program 1106 determines whether or not there is a stripe (non-SWAP area) that has not been subjected to the data SWAP processing in the target physical parcel (step 2305). When there is the non-SWAP area (No in step 2305), the single extension parcel rebalance processing program 1106 returns to step 2303 and executes similar processing on the next physical stripe in the target physical parcel.

When it is determined that there is no non-SWAP area (Yes in step 2305), or when it is determined that the target physical parcel is not the SWAP target (No in step 2302), the single extension parcel rebalance processing program 1106 updates the single extension SWAP pointer 1308 of the target DG in the SWAP pointer table 1004 to the next physical parcel (step 2306).

It should be noted that this SWAP pointer may be updated when the SWAP of the target physical parcel is completed, or may be updated when SWAP of a certain area is completed.

Next, the single extension parcel rebalance processing program 1106 sets the SWAP flag of the entry whose Index # is the target physical parcel in the mapping correction table 1005 to OFF (2307).

Next, the single extension parcel rebalance processing program 1106 cancels the destaging suppression of the target cache slot that has been subjected to the destaging suppression in step 2304 (step 2308).

Next, the single extension parcel rebalance processing program 1106 determines whether or not all the physical parcels in the DG to be extended have been selected as a target physical parcel (step 2309). When there is an unselected physical parcel (No in step 2309), the single extension parcel rebalance processing program 1106 returns to step 2301 to select the next target physical parcel.

It should be noted that any SWAP target physical parcel may be determined in accordance with I/O processing or the like. Data normally cannot be allocated to an area where data SWAP processing has not been performed. However, immediate data allocation may be enabled to an extension area by preferentially performing the data SWAP processing on the physical parcel corresponding to an area that has received a Write request from the host, for example.

In this case, during the data SWAP processing of the target area, the Write data may be held as dirty data in a cache memory, and destaging to the drive may be permitted when the data SWAP processing of the target area is completed.

When there is no unselected physical parcel (Yes in step 2309), the single extension parcel rebalance processing program 1106 replaces the Current with the Target (step 2310) and ends the processing.

According to the single extension parcel rebalance processing described above, when valid data is stored in the Vchunk corresponding to the physical parcel as the SWAP target, the storage controller 100 reads out the valid data from the physical parcel corresponding to this Vchunk based on the Current, and write the valid data into the physical parcel corresponding to the Vchunk based on the Target. This allows the storage controller 100 to move the data in accordance with a change of the mapping pattern from the Current to the Target.

Figure 27:
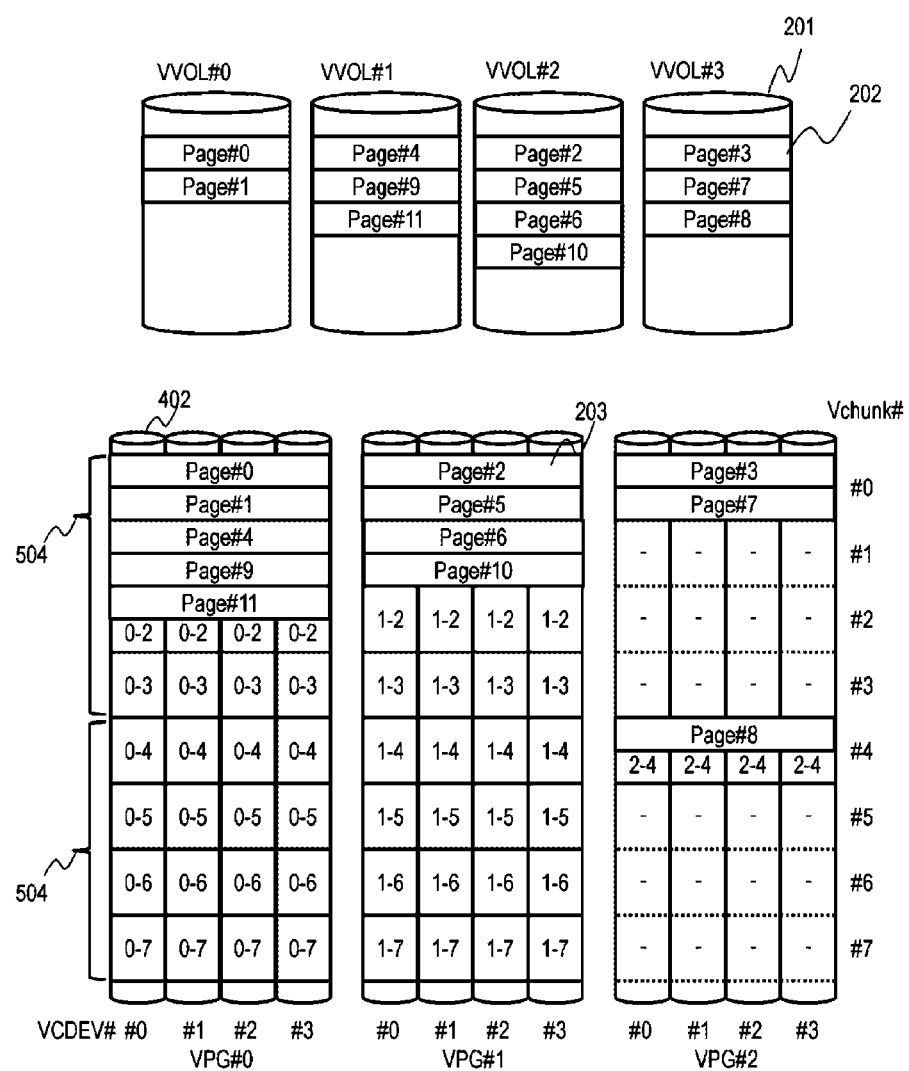
FIG. 27 shows a concept of page allocation processing.

FIG. 27 shows a concept of page allocation processing.

This figure shows an example in which the number of VVOLs=4, c=4, N=4, PG=3, and the number of drives=9. That is, the number of drives is not a multiple of N. The VPG Page 203 of the VPG 204 is allocated to the VVOL Page 202 in the VVOL 201. In the example of this figure, two VVOL pages 202 are allocated per Vchunk, but the number of VVOL pages allocated per Vchunk is variable depending on a page size defined in the system and a parcel size.

In the example of this figure, since a VPG #2 corresponds to a PPG in which the number of drives in the PPG is not N, the VPG #2 includes a Vchunk not available for page allocation. In the example of this figure, VPG Pages in Vchunk #1 to #3 and #5 to #7 of the VPG #2 cannot be allocated to the VVOL pages. Whereas, VPG Pages in Vchunk #0 and #4 of the VPG #2 can be allocated to the VVOL pages.

Figure 28:
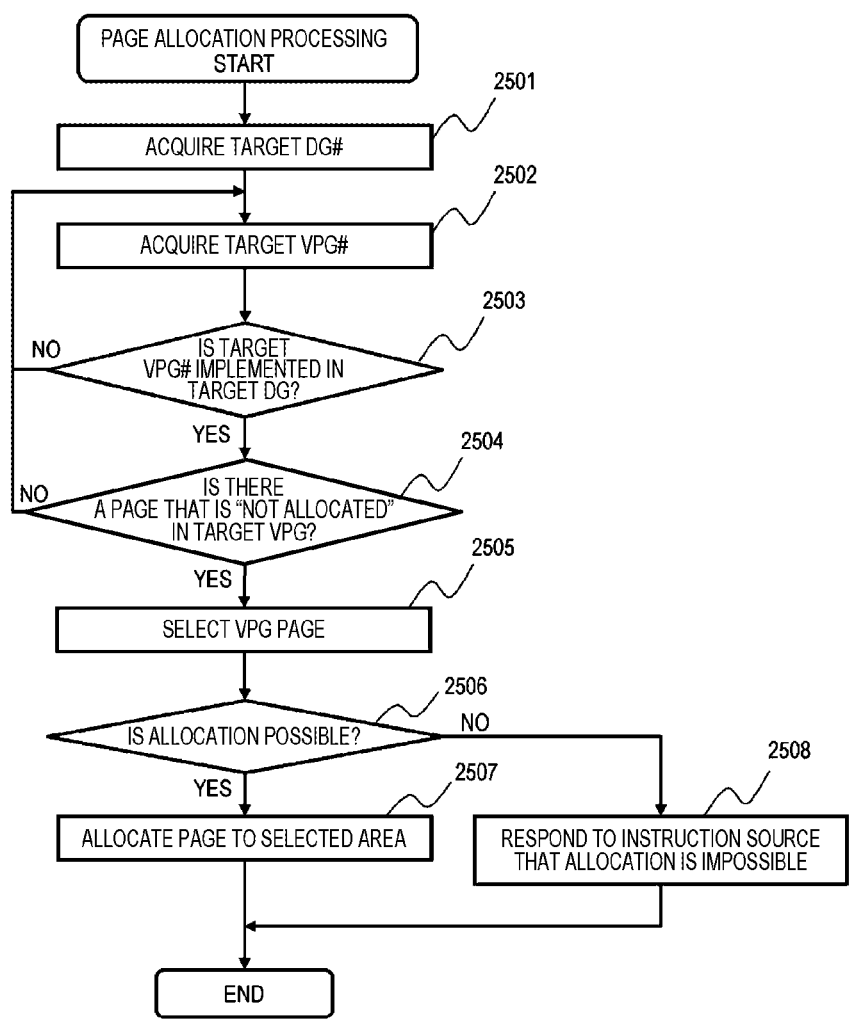
FIG. 28 shows the page allocation processing.

FIG. 28 shows the page allocation processing.

As part of write processing from the host 10, a page allocation processing program 1107 executes the page allocation processing when a VPG Page is not allocated to a write target VVOL page.

Based on the page mapping table 1003, the page allocation processing program 1107 determines whether the VPG Page has been allocated or has not been allocated to the target VVOL page. When the VPG Page has not been allocated to the target VVOL page, information such as "Not allocated" or "Not-Allocated" is stored in the VPG #1303 field of the page mapping table 1003. Consequently, the page allocation processing program 1107 can determine whether the target page has not been allocated. In an initial state of the system (a state in which host I/O has never been executed for the virtual volume 201), all the pages in the virtual volume 201 are "Not allocated (Not-Allocated)".

First, the page allocation processing program 1107 acquires a target DG # (step 2501). In a method of selecting the target DG, for example, it is determined whether or not there is an empty page, in an descending order from a higher tier (high-performance) of a target pool 200, and a DG 207 with a lowest page usage rate is selected as the target DG for the Tier 206 having an empty page. Alternatively, a DG 207 with a lowest I/O load per unit time, a DG 207 with a lowest utilization rate, and a DG 207 with a largest free capacity is selected as the target DG.

After selecting the DG 207, the page allocation processing program 1107 acquires a target VPG # (step 2502). In a method of selecting the target VPG, for example, a VPG with a lowest utilization rate is selected as the target VPG, or an allocation priority is set to a VPG for each VVOL and a VPG with a highest allocation priority is selected as the target VPG.

Next, the page allocation processing program 1107 refers to the pool management table 1001 to determine whether or not the target VPG is implemented in the target DG (step 2503).

When the target VPG is not implemented in the target DG (NO in step 2503), the page allocation processing program 1107 returns to step 2502, selects a different target VPG #, and executes the determination again in step 2503.

When the target VPG is implemented in the target DG (YES in step 2503), the page allocation processing program 1107 determines whether or not there is an empty page in the target VPG (step 2504). Here, the page allocation processing program 1107 refers to the page mapping table 1003 and determines whether or not there is a VPG Page 1304 not allocated in the target VPG.

When there is no empty page (NO in step 2504), the page allocation processing program 1107 returns to step 2502, selects a different target VPG #, and executes the determination of step 2503 and step 2504 again. When there is an empty page (YES in step 2504), the page allocation processing program 1107 selects a target VPG Page from the target VPG (step 2505). In a method of selecting the target VPG Page, for example, from among empty pages in the target VPG, a page with a smallest VPG Page # is selected as the target VPG Page.

When the target VPG Page cannot be selected even if all the VPGs in the target DG have been subjected to the above processing (NO in step 2506), the page allocation processing program 1107 responds that allocation is impossible to an instruction source of the page allocation processing (step 2508), and ends the processing.

When the target VPG Page can be selected (YES in step 2506), in order to allocate the target VPG Page to the VVOL Page, the page allocation processing program 1107 registers the target VPG Page in the entry of the target VVOL Page in the page mapping table (step 2507) and ends the processing.

According to the page allocation processing described above, the storage controller 100 can efficiently utilize a VPG space by allocating a necessary VPG Page to the VVOL page. In addition, since it is not necessary to match the unit of host access data with the unit of the distributed RAID, both of the host access and the distributed RAID can be efficiently operated.

It should be noted that the storage controller 100 may provide a VPG space to the host 10 instead of the VVOL space. In this case, the storage controller 100 does not need to use the page mapping table.

Figure 29:
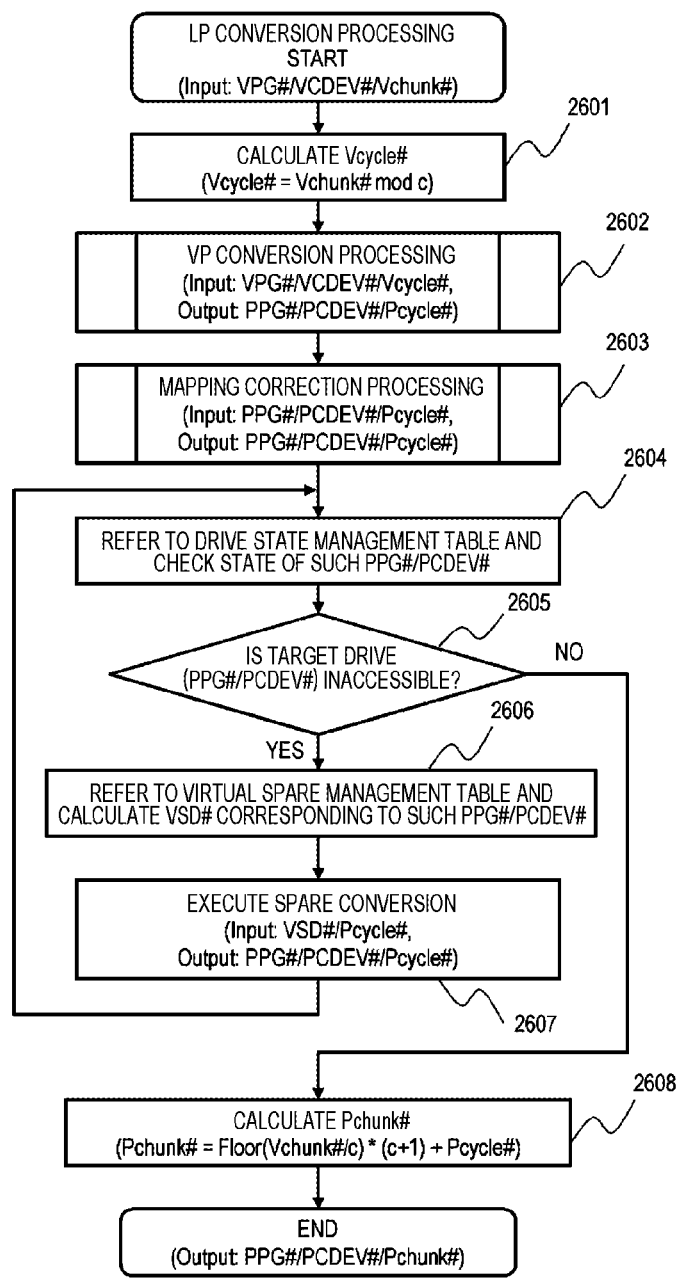
FIG. 29 shows LP conversion processing.

FIG. 29 shows LP conversion processing.

The logical-physical (LP) conversion processing is executed by the LP conversion processing program 1108. The LP conversion is a conversion processing from an address of the logical storage area into an address of the physical storage area. The LP conversion processing is called from the page conversion processing or the like when an I/O request is received from the host 10. The page conversion processing converts an address in a virtual volume specified by the I/O request into an address of a VPG space. The LP conversion processing converts an address (VPG #, VCDEV #, Vchunk #) of a VPG space, which is a specified virtual address, into an address (PPG #, PCDEV #, Pchunk #) of a PPG space, which is a physical data storage destination. In this case, an area indicated by an address of a specified VPG space is referred to as a target logical storage area, and an area indicated by an address of the PPG space after conversion is referred to as a target physical storage area.

First, the LP conversion processing program 1108 calculates a Vcycle # from a Vchunk # (step 2601). The Vcycle # can be calculated by: Vcycle #=Vchunk # mod c.

Next, the LP conversion processing program 1108 executes Virtual-Physical (VP) conversion processing (step 2602). For the VP conversion processing, for example, a method disclosed in PTL 1 is used. For example, in the VP conversion processing, the LP conversion processing program 1108 calculates a regular PPG space address corresponding to the VPG #, the VCDEV #, and the Vcycle # by referring to the Goal mapping pattern (the VCDEV mapping table 1007 and the Vcycle mapping table 1008). The regular PPG space address is the PPG #, the PCDEV #, and the Pcycle # corresponding to the VPG #, the VCDEV #, and the Vcycle # when the number of drives in the DG is an integral multiple of N and none of the drives has failed, and the regular PPG space address is a PPG space address before correction with the mapping correction table 1005.

Next, the LP conversion processing program 1108 refers to the mapping correction table 1005, and corrects the PPG #, the PCDEV #, and the Pcycle # that have been calculated in step 2602 (step 2603). Details of the mapping correction processing will be described later.

Next, the LP conversion processing program 1108 refers to the drive state management table 1002 and acquires the state 1207 of a drive corresponding to the target drive, that is, the PPG # and the PCDEV # calculated in step 2603 (step 2604). The LP conversion processing program 1108 determines whether or not the state 1207 of the target drive is "inaccessible" (step 2605).

When the state 1207 of the target drive is "inaccessible" (YES in step 2605), the data has been saved in an spare area. Therefore, the LP conversion processing program 1108 calculates an address of a spare destination. In this case, the LP conversion processing program 1108 acquires a VSD # (an identifier of the virtual spare drive 502) corresponding to the PPG # and the PCDEV #, from the virtual spare management table 1012 (step 2606).

Next, the LP conversion processing program 1108 executes spare conversion processing (step 2607). Here, the LP conversion processing program 1108 refers to the spare conversion table 1010 and acquires a PPG #, a PCDEV #, and a Pcycle # of a corresponding spare area, from the Pcycle # and the VSD # that has been calculated in step 2606. Thereafter, the LP conversion processing program 1108 executes step 2604 again on the calculated PPG #, PCDEV #, and Pcycle #. When the spare destination is further saved in the spare area, the LP conversion processing program 1108 repeats steps 2606 and 2607.

When the state 1207 of the target drive is "normal", that is, when accessible (NO in step 2605), the PPG #, the PCDEV #, and the Pcycle # of the regular physical address are being used as data storage destinations. Therefore, the LP conversion processing program 1108 calculates a Pchunk # from the regular physical address (step 2608), and ends the processing. The Pchunk # can be calculated by: Pchunk #=Floor (Vchunk #/c)*(c+1)+Pcycle #.

It should be noted that, when the number of spare Pchunks is m (m is an integer of 1 or more), the Pchunk # can be calculated by: Pchunk #=Floor (Vchunk #/c)*(c+m)+Pcycle #.

Figure 30:
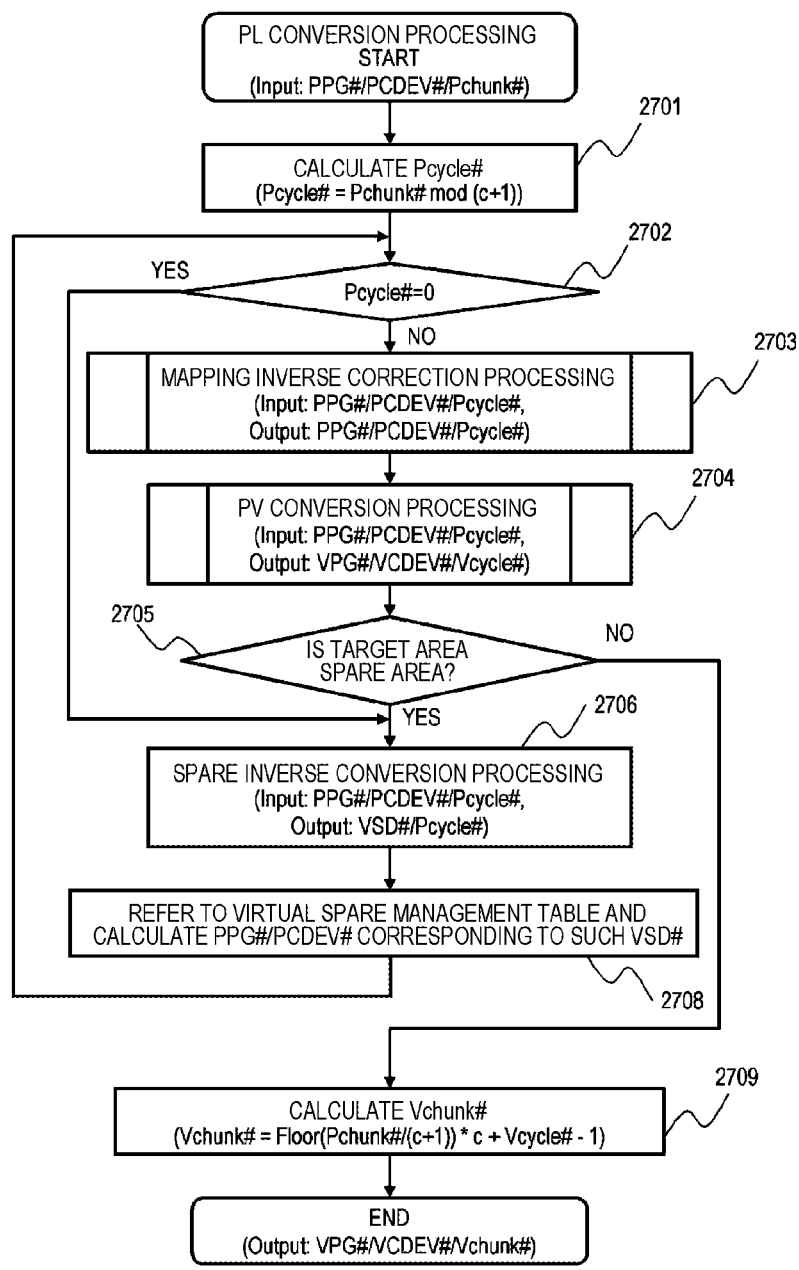
FIG. 30 shows PL conversion processing.

FIG. 30 shows PL conversion processing.

The physical-logical (PL) conversion processing is executed by the PL conversion processing program 1109. The PL conversion is a conversion processing from a physical storage area into a logical storage area. The PL conversion is, for example, processing used for specifying data corresponding to a failed physical storage area in rebuild processing. The PL conversion converts an address (PPG #, PCDEV #, Pchunk #) of a PPG space, which is a specified physical data storage destination, into an address (VPG #, VCDEV #, Vchunk #) of a VPG space, which is a virtual address. The PL conversion corresponds to an inverse conversion of the LP conversion. That is, if the PL conversion is executed based on a result after performing the LP conversion, the same address is returned. Also vice versa. In this case, an area indicated by an address of a specified PPG space is referred to as a target physical storage area, and an area indicated by an address of the VPG space after conversion is referred to as a target logical storage area.

In the following, an example is shown in which a number m of spare Pchunk 501b per Pchunk cycle 505 is one.

First, the PL conversion processing program 1109 calculates a Pcycle # from the Pchunk # (step 2701). The Pcycle # can be calculated by: Pcycle #=Pchunk # mod (c+1).

It should be noted that, when the number of spare Pchunks is m (m is an integer of 1 or more), the Pcycle # can be calculated by: Pcycle #=Pchunk # mod (c+m).

Next, the PL conversion processing program 1109 executes physical-virtual (PV) conversion processing (step 2702). For the PV conversion processing, for example, a method shown also in PTL 1 is used. For example, in the PV conversion processing, the PL conversion processing program 1109 refers to the Goal mapping pattern (the Pcycle mapping table 1009 and the VCDEV mapping table 1007), and calculates a regular VPG space address corresponding to the PPG #, the PCDEV #, and the Pcycle #. The regular VPG space address is the VPG #, the VCDEV #, and the Vcycle # corresponding to the PPG #, the PCDEV #, and the Pcycle # when the number of drives in the DG is an integral multiple of N and none of the drives has failed, and the regular VPG space address is a VPG space address before correction with the mapping correction table 1005.

Next, the PL conversion processing program 1109 refers to the mapping inverse correction table 1006, and corrects the inputs PPG #, PCDEV #, and Pcycle # that has been calculated in step 2701 (step 2703). Details of the mapping correction processing will be described later.

Next, the PL conversion processing program 1109 determines whether or not the target physical storage area is a spare area (step 2705). Here, when the Pcycle # is zero, the PL conversion processing program 1109 determines that the target area is a spare area.

When the target physical storage area is the spare area (YES in step 2705), the PL conversion processing program 1109 executes spare inverse conversion processing (step 2706). The PL conversion processing program 1109 refers to the spare inverse conversion table 1011, and acquires a VSD # and a Pcycle # from the PPG #, the PCDEV #, and the Pcycle #.

Thereafter, the PL conversion processing program 1109 acquires a PPG # and a PCDEV # corresponding to the VSD # from the virtual spare management table 1012 (step 2708). The PL conversion processing program 1109 again performs determination of the PV conversion processing in step 2702 on the calculated PPG #, PCDEV #, and Pcycle #. This processing is repeated until an area other than the spare area is calculated.

When the target area is not a spare area (NO in step 2705), the PL conversion processing program 1109 calculates a Vchunk # (step 2709) and ends the processing. The Vchunk # is calculated by: Vchunk #=Floor (Pchunk #/(c+1))*c+Vcycle #−1.

It should be noted that, when the number of spare Pchunks is m (m is an integer of 1 or more), the Vchunk # is calculated by: Vchunk #=Floor (Pchunk #/(c+m))*c+Vcycle #−1.

Figure 31:
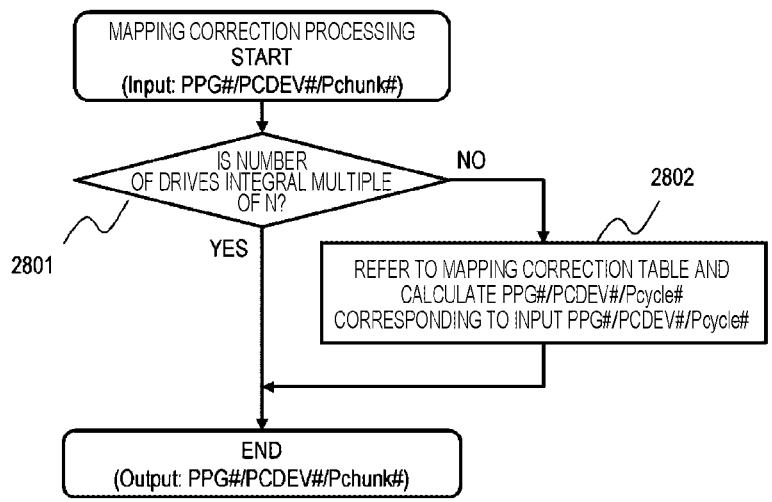
FIG. 31 shows mapping correction processing.

FIG. 31 shows the mapping correction processing.

The mapping correction processing program 1110 executes the mapping correction processing in step 2603 of the above-described LP conversion processing. The mapping correction processing converts an address of a physical storage area as a SWAP source into an address of a physical storage area to be a SWAP destination.

First, the mapping correction processing program 1110 refers to the number of drives in the DG and determines whether or not the number of drives is an integral multiple of N (step 2801). When the number of drives is an integral multiple of N (Yes in step 2801), the mapping correction processing program 1110 ends the processing (outputs an input value as it is) since the mapping correction processing is unnecessary.

When the number of drives is not an integral multiple of N (No in step 2801), the mapping correction processing program 1110 refers to the mapping correction table 1005, calculates the PPG #1403, the PCDEV #1404, and the Pcycle #1405 corresponding to input values PPG #1400, PCDEV #1401, and Pcycle #1402, and sets the calculated values as output values (step 2802).

According to the above mapping correction processing and LP conversion processing, the storage controller 100 can convert an address of a VPG space that is based on the I/O request into an address of a PPG space, and access the PPG space. Further, when the number of drives is an integral multiple of N, the storage controller 100 can execute address conversion by using the Goal mapping pattern to perform optimum load distribution, and when the number of drives is not an integral multiple of N, the storage controller 100 can correct the Goal mapping pattern by using the mapping correction table to perform address conversion with slight correction.

Figure 32:
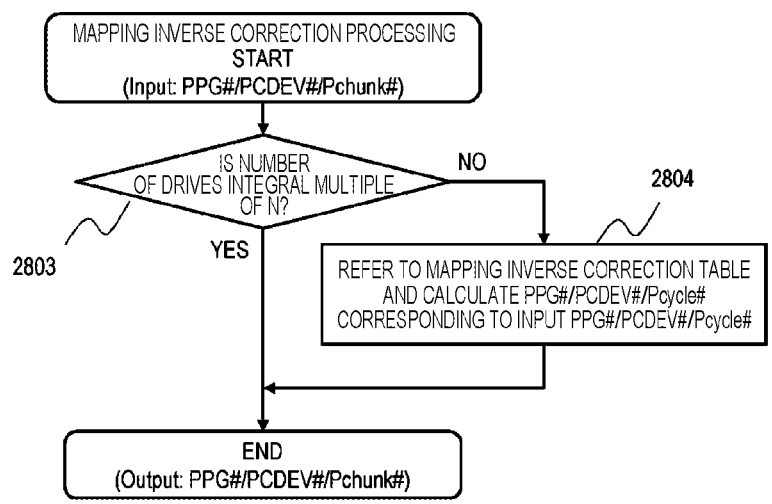
FIG. 32 shows mapping inverse correction processing.

FIG. 32 shows mapping inverse correction processing.

The mapping correction processing program 1110 executes the mapping inverse correction processing in step 2703 of the above-described PL conversion processing. The mapping inverse correction processing converts an address of a physical storage area to be a SWAP destination into an address of a physical storage area as a SWAP source.

First, the mapping correction processing program 1110 refers to the number of drives in the DG and determines whether or not the number of drives is an integral multiple of N (step 2803). When the number of drives is an integral multiple of N (Yes in step 2803), the mapping correction processing program 1110 ends the processing (outputs an input value as it is) since the mapping inverse correction processing is unnecessary.

When the number of drives is not an integral multiple of N (No in step 2803), the mapping correction processing program 1110 refers to the mapping inverse correction table 1006, calculates the PPG #1410, the PCDEV #1411, and the Pcycle #1412 corresponding to input values PPG #1407, PCDEV #1408, and Pcycle #1409, and sets the calculated values as output values (step 2804).

According to the above mapping inverse correction processing and PL conversion processing, in the rebuild processing, the storage controller 100 can convert an address of a PPG space of a failed drive 170 into an address of a VPG space, and specify data necessary for the rebuilding. Further, when the number of drives is an integral multiple of N, the storage controller 100 can execute address conversion by using the Goal mapping pattern to perform optimum load distribution, and when the number of drives is not an integral multiple of N, the storage controller 100 can correct the Goal mapping pattern by using the mapping correction table to perform address conversion with slight correction.

It should be noted that, in the present embodiment, the extension method for a single drive has been described. However, by using a similar concept, it is also possible to execute reduction processing for a single drive.

At a time of reduction, firstly, new Write to a reduction target drive is inhibited, and then data stored in the reduction target drive is transferred to a drive other than the reduction target drive. Thereafter, by inversely executing the method shown in FIG. 19 or FIG. 20, a mapping pattern after reduction is generated. The Goal mapping pattern at a time of reduction is a mapping pattern generated under a condition of: number of drives=N×{number of PGs after reduction}.

After generating a mapping pattern after reduction, the parcel rebalance processing of FIG. 26 is executed, and the reduction target drive is removed from the system after the parcel rebalancing is completed.

The computer system of the present embodiment enables extension on a drive basis in a distributed RAID system. Since the number of the Vchunks c included in one Vchunk cycle of one VPG is an integral multiple of the number of drives N included in one PPG, redundancy for extensional capacity can be secured even in extension on a drive basis. PTL 1 discloses a mapping method between a VPG and a PPG in a storage system configured on a PG basis. In the present embodiment, a mapping pattern of a configuration on a PG basis is defined as a target mapping pattern, and virtual parcels associated with two physical parcels are subjected to SWAP so as to be close to the target mapping pattern as much as possible. This enables distribution of data of the Vchunk to a plurality of drives as much as possible, and allows the performance of the I/O processing and the rebuild processing to be closer to the performance of the configuration on a PG basis. Further, by extending a drive in units smaller than a PG, it is possible to reduce the cost of one extension.

Terms will be described. A physical storage device corresponds to the physical storage drive 170 or the like. A computer corresponds to the storage controller 100, a computer having the function of the storage controller, or the like. A logical storage area corresponds to the virtual parcel, the virtual stripe, or the like. A physical storage area corresponds to the physical parcel, the physical stripe, or the like. A logical parity group corresponds to the virtual parity group or the like. The mapping information corresponds to the mapping pattern or the like. Reference mapping information corresponds to the Goal mapping pattern or the like. Correction mapping information corresponds to the mapping correction table, the mapping inverse correction table, or the like. A spare physical storage area corresponds to the spare area or the like.

A symbol d corresponds to the number of physical storage drives in the DG or the like. A symbol n corresponds to the number N of virtual storage drives in the virtual parity group, the number N of physical storage drives in the physical parity group, or the like. A symbol m corresponds to the number of spare Pchunks m within the Pchunk cycle, or the like. A symbol v corresponds to c/N or the like. A symbol n×v corresponds to the number of Vchunks (number of cycle Vchunks) c within the Vchunk cycle, or the like. A symbol w corresponds to the number of Vchunk cycles in the DG, the number of Pchunk cycles in the DG, or the like. A symbol r corresponds to the number of physical storage drives to be extended, or the like. A symbol e corresponds to the number of virtual storage devices after extension, or the like.

Although the embodiments of the present invention have been described above, the embodiments described above have been illustrated in detail to facilitate description for easy understanding of the present invention, and the present invention is not necessarily limited to the embodiments that include all the illustrated configurations. Additionally, a part of a configuration of an example may be replaced with a configuration of another example, and a configuration of an example may be added with a configuration of another example. Moreover, a part of a configuration of each embodiment may be deleted, replaced, or added with another configuration. The configuration of the figure shows what is considered to be necessary for the explanation, and does not necessarily indicate all the configuration on the product.

REFERENCE SIGNS LIST

10 host
20 management server 30 network
100 storage controller
110 FEPK
111 port
112 maintenance interface
120 CPU
121 Core
122 LM
130 CMPK
131 CM
140 BEPK
150 internal network
160 drive enclosure
161 switch

The invention claimed is:

1. A computer system comprising:
d pieces of physical storage devices wherein d is an integer of 2 or more; and
a computer connected to the d pieces of physical storage devices,
wherein the computer is configured to:
create n×v×d pieces of physical storage areas by creating n×v pieces of physical storage areas in each physical storage device wherein n is an integer of 2 or more and v is an integer of 1 or more;
create v×d pieces of logical chunks each having a size of n pieces of physical storage areas;
store mapping information that associates n pieces of physical storage areas with each logical chunk, and has been created under a mapping condition that n pieces of physical storage devices respectively include the n pieces of physical storage areas associated with each logical chunk;
when d+r pieces of physical storage devices are connected to the computer by connecting r pieces of physical storage devices to the computer, add v×r pieces of logical chunks wherein r is an integer of 1 or more, add n×v pieces of physical storage areas in each additional storage device, and change the mapping information to mapping information that associates n pieces of physical storage areas with each of v×(d+r) pieces of logical chunks under the mapping condition; and
in response to a write request of user data, create redundant data that is based on the user data, determine a first logical chunk corresponding to the write request, and respectively write n pieces of element data including the user data and the redundant data into n pieces of physical storage areas corresponding to the first logical chunk, based on the mapping information.

2. The computer system according to claim 1,
wherein when valid data is stored in a second logical chunk whose association is to be changed by the change, the computer reads out valid data stored in a first physical storage area corresponding to the second logical chunk based on mapping information before the change, and writes the valid data into a second physical storage area corresponding to the second logical chunk based on mapping information after the change.

3. The computer system according to claim 2,
wherein the computer is configured to store reference mapping information indicating an association of e×v pieces of logical chunks with n×v×e pieces of physical storage areas when e pieces of physical storage devices are connected to the computer, wherein e is a minimum multiple of n that is equal to or more than d+r, and
when d+r is not a multiple of n, the computer expands mapping information before the change by adding information indicating n×v pieces of physical storage areas and v×r pieces of logical chunks to mapping information before the change under the mapping condition, and calculates mapping information after the change by matching a part of the mapping information that has been expanded, with a part of the reference mapping information.

4. The computer system according to claim 3
wherein the computer uses the reference mapping information as mapping information after the change when d+r is a multiple of n.

5. The computer system according to claim 4,
wherein when d+r is not a multiple of n, by sequentially selecting two physical storage areas from the n×v×d pieces of physical storage areas under the mapping condition, and by exchanging two logical chunks respectively associated with the two physical storage areas, the computer matches a part of the mapping information that has been extended with a part of the reference mapping information, creates correction mapping information indicating the exchange, and uses the reference mapping information and the correction mapping information as mapping information after the change.

6. The computer system according to claim 5,
wherein when d+r is not a multiple of n, the computer sequentially selects, under the mapping condition, two first physical storage areas respectively corresponding to two logical chunks in which at least one of two logical chunks before exchange does not coincide with the reference mapping information, and both of two logical chunks after exchange coincide with the reference mapping information; exchanges two logical chunks respectively associated with the two first physical storage areas; sequentially selects, under the mapping condition, two second physical storage areas respectively corresponding to two logical chunks in which at least one of two logical chunks before exchange does not coincide with the reference mapping information, and only one of two logical chunks after exchange coincides with the reference mapping information; exchanges two logical chunks respectively associated with the two second physical storage areas; sequentially selects two third physical storage areas respectively corresponding to two logical chunks in which at least one of two logical chunks before exchange does not coincide with the reference mapping information, and both of two logical chunks after exchange do not coincide with the reference mapping information; and exchanges two logical chunks respectively associated with the two third physical storage areas.

7. The computer system according to claim 6
wherein the computer
is configured to further create m×v pieces of spare physical storage areas in each physical storage device wherein m is an integer of 1 or more, and
when a fault of any physical storage device is detected, specifies a failed physical storage area included in a physical storage device having the fault, specifies a restoration logical chunk corresponding to the failed physical storage area based on the mapping information, selects a normal physical storage area excluding the failed physical storage area from among n pieces of physical storage areas corresponding to the restoration logical chunk based on the mapping information, restores data in the physical storage device having the fault based on data in the normal physical storage area, and writes the data that has been restored into a spare physical storage area in a plurality of physical storage devices excluding the physical storage device having the fault.

8. The computer system according to claim 7 wherein the computer is configured to:

create a virtual volume, create a virtual storage area in the virtual volume, and create virtual storage area mapping information associating at least a part of a logical chunk with the virtual storage area; and determine, in response to an I/O request, a logical chunk corresponding to an address in the virtual volume indicated by the I/O request, based on the virtual storage area mapping information.

9. The computer system according to claim 8 wherein in the change, the computer creates e pieces of logical storage devices, creates e/n pieces of logical parity groups each including n pieces of logical storage devices, and creates n×v pieces of logical chunks in each logical parity group.

10. The computer system according to claim 9, wherein the computer is configured to:

create n×v×w pieces of logical chunks in each logical parity group wherein w is an integer of 2 or more;

create n×v×w pieces of physical storage areas in each physical storage device; and periodically use the mapping information for an address in each logical storage device and an address in each physical storage device.

11. A control method for d pieces of physical storage devices connected to a computer wherein d is an integer of 2 or more, the control method comprising:

creating n×v×d pieces of physical storage areas by creating n×v pieces of physical storage areas in each physical storage device wherein n is an integer of 2 or more and v is an integer of 1 or more;

creating v×d pieces of logical chunks each having a size of n pieces of physical storage areas;

storing mapping information that associates n pieces of physical storage areas with each logical chunk, and has been created under a mapping condition that n pieces of physical storage devices respectively include the n pieces of physical storage areas associated with each logical chunk;

when d+r pieces of physical storage devices are connected to the computer by connecting r pieces of physical storage devices to the computer, adding v×r pieces of logical chunks wherein r is an integer of 1 or more, adding n×v pieces of physical storage areas in each additional storage device, and changing the mapping information to mapping information that associates n pieces of physical storage areas with each of v×(d+r) pieces of logical chunks under the mapping condition; and in response to a write request of user data, creating redundant data that is based on the user data, determining a first logical chunk corresponding to the write request, and respectively writing n pieces of element data including the user data and the redundant data into n pieces of physical storage areas corresponding to the first logical chunk, based on the mapping information.

12. A computer-readable recording medium storing a program for causing a computer connected to d pieces of physical storage devices to execute control processing, wherein d is an integer of 2 or more, wherein the control processing comprises:

creating n×v×d pieces of physical storage areas by creating n×v pieces of physical storage areas in each physical storage device wherein n is an integer of 2 or more and v is an integer of 1 or more;

creating v×d pieces of logical chunks each having a size of n pieces of physical storage areas;

storing mapping information that associates n pieces of physical storage areas with each logical chunk, and has been created under a mapping condition that n pieces of physical storage devices respectively include the n pieces of physical storage areas associated with each logical chunk;

when d+r pieces of physical storage devices are connected to the computer by connecting r pieces of physical storage devices to the computer, adding v×r pieces of logical chunks wherein r is an integer of 1 or more, adding n×v pieces of physical storage areas in each additional storage device, and changing the mapping information to mapping information that associates n pieces of physical storage areas with each of v×(d+r) pieces of logical chunks under the mapping condition; and in response to a write request of user data, creating redundant data that is based on the user data, determining a first logical chunk corresponding to the write request, and respectively writing n pieces of element data including the user data and the redundant data into n pieces of physical storage areas corresponding to the first logical chunk, based on the mapping information.

* * * * *